United States Patent
Baba et al.

(10) Patent No.: US 9,522,554 B2
(45) Date of Patent: Dec. 20, 2016

(54) IMAGE PRINTING APPARATUS AND IMAGE PRINTING METHOD

(71) Applicant: CANON KABUSHIKI KAISHA, Tokyo (JP)

(72) Inventors: Naoko Baba, Kawasaki (JP); Shingo Nishioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/580,119

(22) Filed: Dec. 22, 2014

(65) Prior Publication Data

US 2015/0183213 A1 Jul. 2, 2015

(30) Foreign Application Priority Data

Dec. 27, 2013 (JP) .................................. 2013-272399

(51) Int. Cl.
*B41J 25/00* (2006.01)
*B41J 2/21* (2006.01)
*G06K 15/10* (2006.01)

(52) U.S. Cl.
CPC ............. *B41J 25/001* (2013.01); *B41J 2/2132* (2013.01); *G06K 15/107* (2013.01)

(58) Field of Classification Search
CPC ..... B41J 25/001; B41J 2/2132; G06K 15/107; G06K 15/102
USPC .................................................. 347/9, 19, 20
See application file for complete search history.

(56) References Cited

U.S. PATENT DOCUMENTS

2008/0252686 A1* 10/2008 Kanda .................... B41J 2/2132
347/37

* cited by examiner

*Primary Examiner* — Jason Uhlenhake
(74) *Attorney, Agent, or Firm* — Canon U.S.A., Inc. IP Division

(57) ABSTRACT

A first area in which an image is printed in K scans and a second area in which an image is printed in (K+1) scans are arranged in an arranging direction to print an image. When an image is printed in the second area from ejection ports disposed at one end of the ejection port array and ejection ports disposed at the other end, mask patterns having first pixel group areas at different positions therein are applied.

18 Claims, 19 Drawing Sheets

IMAGE PRINTING APPARATUS AND IMAGE PRINTING METHOD

BACKGROUND OF THE INVENTION

Field of the Invention

The present invention relates to an image printing apparatus and an image printing method.

Description of the Related Art

Image printing apparatuses that form an image on a printing medium by scanning a print head having a plurality of ink ejection ports arranged therein over the printing medium and, at the same time, ejecting ink from the ejection ports have been developed. Such image printing apparatuses employ a so-called multipass method in which a unit area of the printing medium is scanned a plurality of times. In recent years, to reduce the print time, reduction in the number of scans during printing has been required.

In such printing apparatuses, the ink droplet impacting position may be misaligned due to misalignment of a printing medium occurring during conveyance of the printing medium or the offset of the ink droplet ejecting direction occurring in an end portion of the ejection port array caused by an air flow generated by ink ejection. Thus, a stripe-shaped density unevenness (hereinafter referred to as "bond stripes") may be formed in an image area formed by ink ejection from the ejection port in the end portion of the ejection port array. The bond stripes are more prominently formed as the number of scans for a unit area is smaller and as the ejection volume of ink in one scan is larger.

U.S. Patent Application Publication No. 2008/0252686 describes a printing method in which an image is formed in a first area of a printing medium by scanning a print head over the first area K times while an image is formed in a second area that differs from the first area of the printing medium by scanning the print head over the second area (K+1) times. In the printing method, the conveyance of a printing medium is controlled so that in each of two of (K+1) scans over the second area, a plurality of ejection ports arranged in each of both end portions of the ejection port array correspond to the second area. According to U.S. Patent Application Publication No. 2008/0252686, by performing control so that the ejection volume per scan during (K+1) scans over the second area is less than the ejection volume per scan during K scans over the first area, high-speed printing is available without the occurrence of the above-described bond stripes.

However, in the technology described in U.S. Patent Application Publication No. 2008/0252686, uneven gloss may be generated between an image printed in the first area and an image printed in the second area and, thus, the quality of the entire image may decrease.

Such an issue is described in more detail below.

Note that in the following example, an image is formed in two scans over the first area and three scans over the second area.

If printing is performed using the printing method described in U.S. Patent Application Publication No. 2008/0252686, an image is printed in three scans over the entire second area. Accordingly, the formed image includes an image printed in the first area in two scans and an image printed in the second area in three scans.

Note that in general, the glossiness decreases with increasing number of scans in which ink is ejected onto an area of the printing medium. This is because if the number of scans in which ink is ejected onto the same area increases, an image is formed by stacking ink droplets one on top of another and, thus, the surface irregularities of the final image increase. As a result, the glossiness decreases.

Accordingly, in the printing method described in U.S. Patent Application Publication No. 2008/0252686, an image having a relatively high glossiness in the first area and an image having a relatively low glossiness in the second area are alternately formed along the conveyance direction of the printing medium. In this manner, images having different gloss levels are present on the printing medium, and the human eye instantly recognizes the uneven gloss.

If an image is printed in three scans over the entire area of the printing medium, the period of time until completion of printing is completed relatively increases.

SUMMARY OF THE INVENTION

Accordingly, the present invention provides an image printing apparatus and an image printing method capable of reducing a period of time until completion of printing and preventing the occurrence of bond stripes and uneven gloss.

According to an aspect of the present invention, an image printing apparatus for printing an image is provided. The image printing apparatus includes a print head including an ejection port array having a plurality of ink ejection ports arranged in an arranging direction to eject ink, a scanning unit configured to relatively scan the print head over a printing medium in a scanning direction that crosses the arranging direction a plurality of times, a conveying unit configured to relatively convey the printing medium in a conveyance direction that crosses the scanning direction between scans of the print head performed by the scanning unit so that a first area in which an image is printed in K ($K \geq 2$) scans of the print head and a second area in which an image is printed in (K+1) scans of the print head are arranged in the printing medium in the arranging direction, a plurality of first ejection ports arranged at one end of the ejection port array in the arranging direction form an image in the second area in a first scan of the (K+1) scans and a plurality of second ejection ports arranged in the other end of the ejection port array in the arranging direction form an image in the second area in a second scan that differs from the first scan of the (K+1) scans, an acquiring unit configured to acquire first image data corresponding to the ejection ports other than the first ejection ports and the second ejection ports and second image data corresponding to at least the first ejection ports and the second ejection ports, a generating unit configured to generate first print data items used for printing an image in the K scans over the first area on the basis of the first image data and K first mask patterns each having print permitting pixels and non-print permitting pixels therein and corresponding to one of the K scans over the first area and second print data items used for printing an image in the (K+1) scans over the second area on the basis of the second image data and (K+1) second mask patterns each having print permitting pixels and non-print permitting pixels therein and corresponding to one of the (K+1) scans over the second area, and an ejection control unit configured to cause the print head to eject ink into the first area in accordance with the first print data item generated by the generating unit in each of the K scans and cause the print head to eject ink into the second area in accordance with the second print data item generated by the generating unit in each of the (K+1) scans. (i) Among the (K+1) second mask patterns, each of the second mask patterns corresponding to the first ejection ports and the second mask patterns corresponding to the second ejection ports is formed from a plurality of first pixel group areas each having the print permitting pixels and the non-print permitting pixels disposed therein and a plurality of second pixel group areas each having only the non-print permitting pixels disposed therein. (ii) Each of the first pixel group areas of the second mask pattern corresponding to the first ejection ports is disposed at a position corresponding to one of the second pixel group areas of the second mask pattern corresponding to the second ejection ports, and each of the first pixel group areas of the second mask pattern corresponding to the second ejection ports is disposed at a position corresponding to one of the second pixel group areas of the second mask pattern corresponding to the first ejection ports. (iii) For each of the second mask pattern corresponding to the first ejection ports and the second mask pattern corresponding to the second ejection ports, a print permission ratio representing the ratio of the number of print permitting pixels to the sum of the number of print permitting pixels and the number of non-print permitting pixels is lower than the print permission ratio for each of the K first mask patterns.

Further features of the present invention will become apparent from the following description of exemplary embodiments with reference to the attached drawings.

DESCRIPTION OF THE EMBODIMENTS

First Exemplary Embodiment

A first exemplary embodiment of the present invention is described in detail below.

Figure 1:
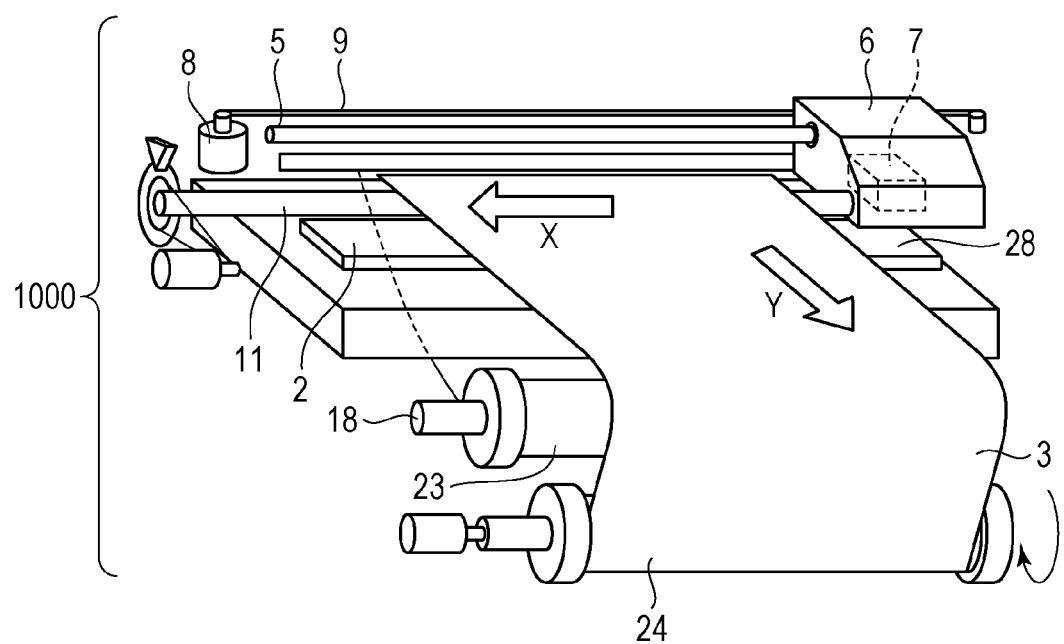
FIG. 1 is a perspective view of an image printing apparatus according to an exemplary embodiment.
Figure 2:
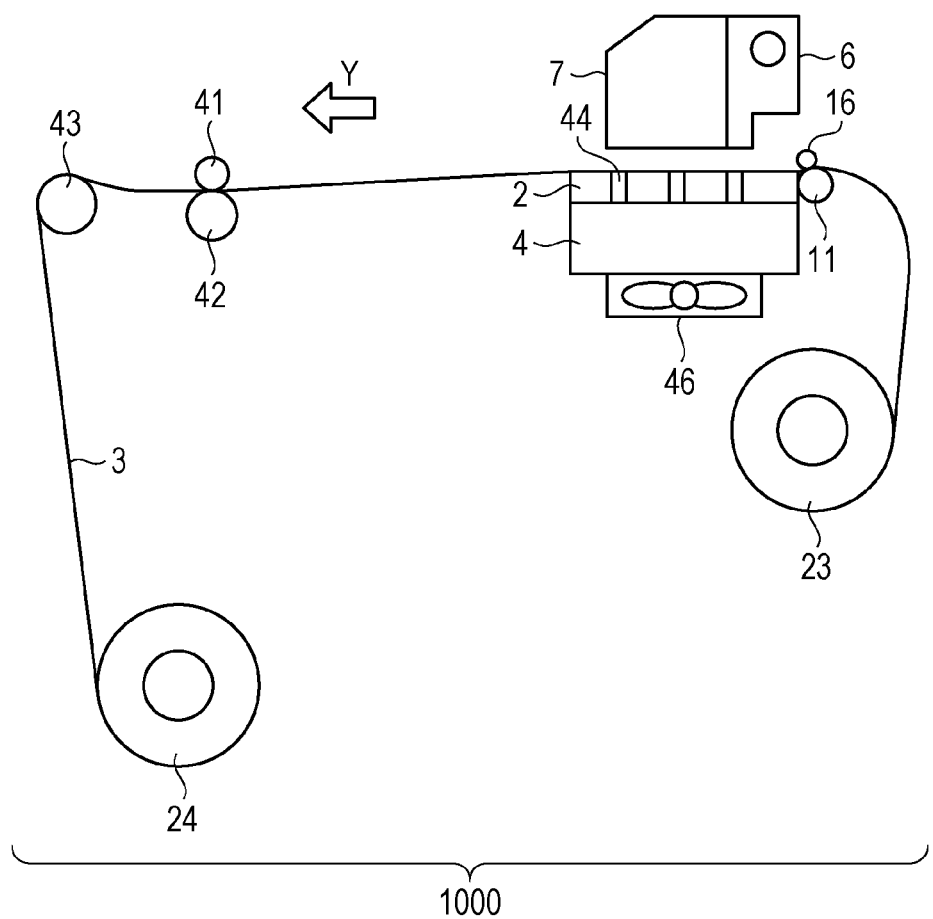
FIG. 2 is a side view of the image printing apparatus according to the exemplary embodiment.

FIG. 1 is a partial perspective view of the internal structure of an image printing apparatus 1000 according to the first exemplary embodiment. FIG. 2 is a partial side view of the internal structure of the image printing apparatus 1000 according to the first exemplary embodiment.

The image printing apparatus 1000 includes a casing 1. A platen 2 is disposed on top of the casing 1. The platen 2 has a plurality of suction holes 34 to suction the printing medium 3 in order to prevent the printing medium 3 from separating and raising from the platen 2. Each of the suction holes 34 communicates with a duct 4. A suction fan 36 is disposed in the lower portion of the duct 4. The suction fan 36 operates to suck air through the suction holes 34 and pull the printing medium 3 against the platen 2.

In addition, the casing 1 has a main rail 5 disposed along the long side direction of the casing 1. The main rail 5 supports a carriage 6 that reciprocally moves in an X direction (the scanning direction). The carriage 6 has a print head 7 of an inkjet type mounted thereon. Note that the print head 7 may be of a variety of ink jet printing types, such as a thermal jet type using a heating element or a piezoelectric type using a piezoelectric transducer. A carriage motor 8 functions as a drive source for moving the carriage 6 in the X direction. The rotational driving force of the carriage motor 8 is transferred to the carriage 6 by a belt 9.

The printing medium 3, such as a print paper sheet or a plastic sheet, is fed from a feed medium 23 of a roll type. The fed printing medium 3 is conveyed by a predetermined length Δd in a Y direction (the conveyance direction) using a first conveyance roller and a second conveyance roller at points in time in accordance with a scan of the print head 7. The first conveyance roller and the second conveyance roller are disposed with a predetermined spacing therebetween. Note that the first conveyance roller is formed from a pair consisting of a drive roller 11 that is driven by a stepping motor (not illustrated) and an idle roller 16 that rotates with the rotation of the drive roller 11. Similarly, the second conveyance roller is formed from a pair consisting of a drive roller 42 and an idle roller 41. The printing medium 3 is wound around a winding roller 24 via a turn roller 33. Note that instead of a printing medium 3 of a roll type, the image printing apparatus 1000 can print an image on a printing medium 3 which is cut into a predetermined size and is stacked in a cassette.

By using such a configuration, the print head 7 can be scanned in the X direction while ejecting ink from the ejection ports of the print head 7 in accordance with print data. Thus, ink dots are formed on the printing medium 3, and printing can be performed. The print head 7 is moved to a home position as needed and is subjected to a recovery operation performed by an ejection recovery device (not illustrated) disposed at the home position. In this manner, ejection failure caused by, for example, clogging of the ejection ports can be recovered. Note that, to remove ink remaining in the vicinity of the ejection port of the print head 7 and having a varied density, the ink is absorbed, and an ink concentration resetting operation is performed on ink for preliminary ejection at the home position.

Figure 3:
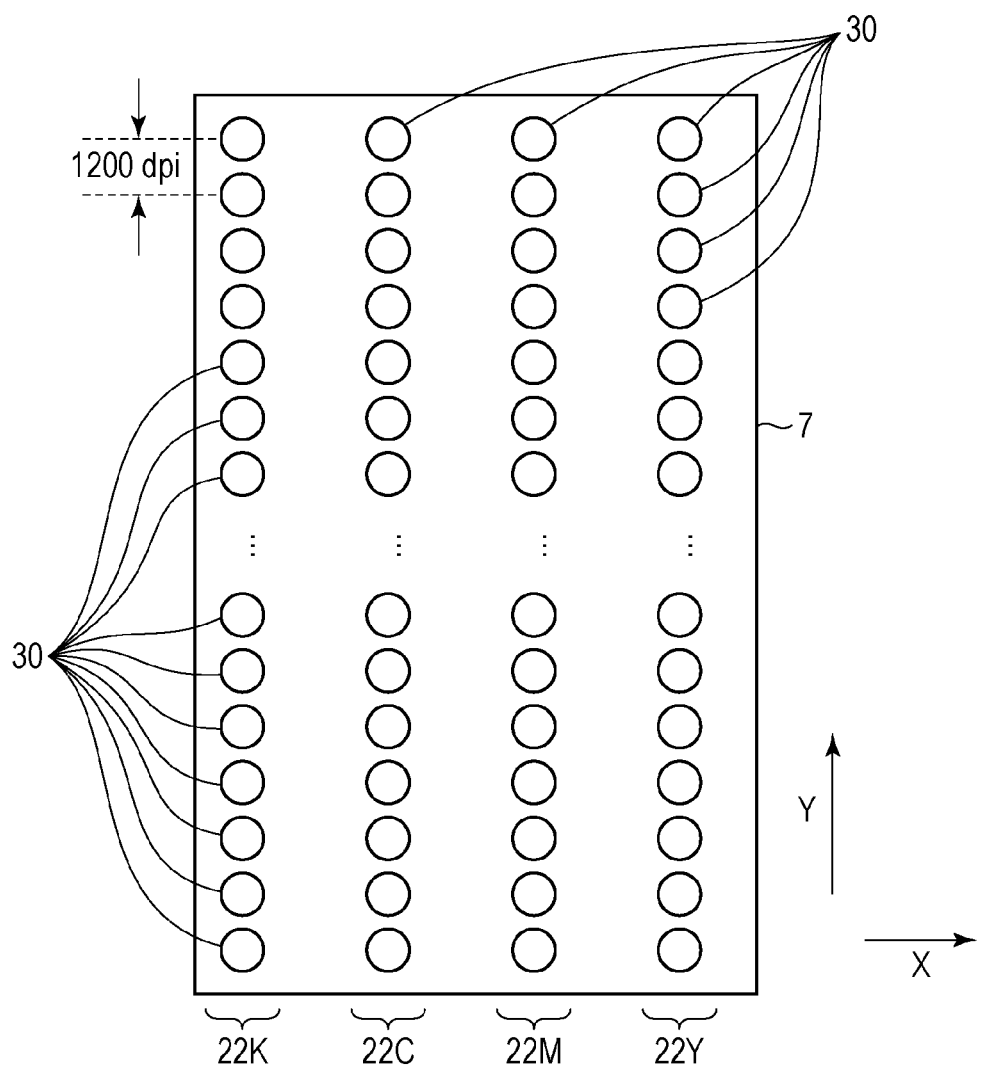
FIG. 3 illustrates a print head according to the exemplary embodiment.

FIG. 3 illustrates the print head 7 according to the present exemplary embodiment.

The print head 7 includes four ejection port arrays 22K, 22C, 22M, and 22Y for ejecting black ink (K), cyan (C) ink, magenta (M) ink, and yellow (Y) ink, respectively. The ejection port arrays 22K, 22C, 22M, and 22Y are arranged in the X direction so as to be parallel to one other. Each of the ejection port arrays 22K, 22C, 22M, and 22Y includes 1440 (N) ink ejection ports 30 arranged in the Y direction (the arranging direction) with a density of 1200 dpi. Note that according to the present exemplary embodiment, the ejection volume of ink ejected from one of the ejection ports 30 at one time is about 4.5 ng.

The ejection port arrays 22K, 22C, 22M, and 22Y are connected to ink tanks (not illustrated) storing ink having corresponding colors. Thus, ink is supplied to each of the ejection port arrays 22K, 22C, 22M, and 22Y. Note that according to the present exemplary embodiment, the print head 7 and the ink tanks may be integrated into one body or may be detachable from each other.

Figure 4:
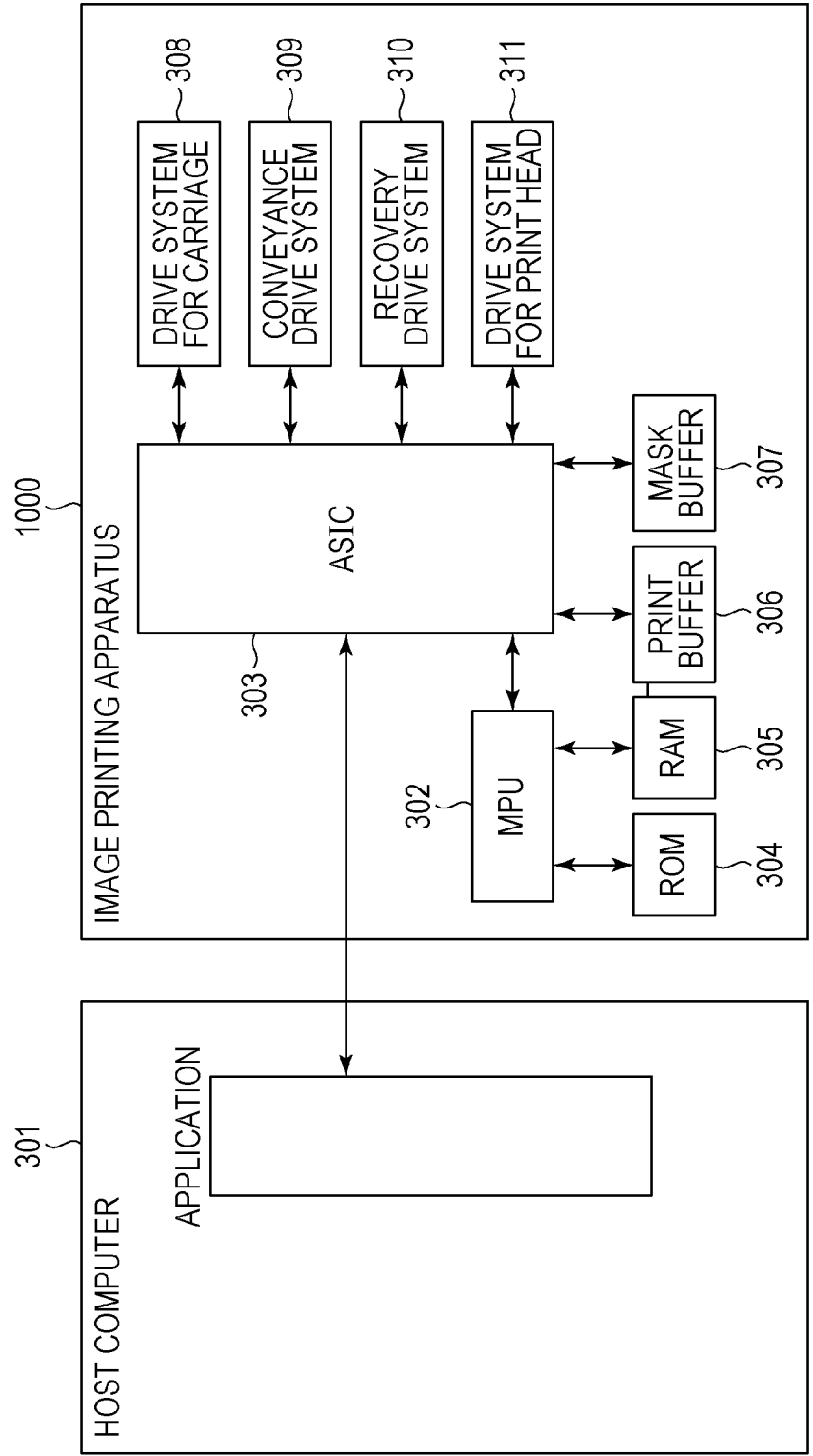
FIG. 4 is a block diagram of the configuration of a print control system according to the present embodiment.

FIG. 4 is a block diagram of a schematic configuration of a print control system according to the present exemplary embodiment.

A host computer 301 serving as an image input apparatus transmits, to an image processing unit disposed in the image printing apparatus 1000, RGB multivalued image data stored in a variety of storage media, such as a hard disk, via an application program.

The image processing unit includes a microprocessor unit (MPU) 302 and an application specific integrated circuit (ASIC) 303 (described in more detail below). In addition, the image processing unit can receive multivalued image data from an external image input apparatus connected to the host computer 301, such as a scanner and a digital camera. The image processing unit performs image processing (described in more detail below) on the input multivalued image data and converts the data into binary image data. In this manner, the binary image data serving as the print data used for ejecting a plurality of colors of ink from the print head 7 is generated.

The image printing apparatus 1000 serving as an image output apparatus prints an image by applying ink onto the printing medium 3 on the basis of the binary image data generated by the image processing unit. The image printing apparatus 1000 is controlled by the MPU 302 in accordance with a program stored in a read only memory (ROM) 304. A random access memory (RAM) 305 functions as a working area and a temporary data storage area of the MPU 302. The MPU 302 controls a drive system 308 of the carriage 6, a conveyance drive system 309 of the printing medium 3, a recovery drive system 310 of the print head 7, and a drive system 311 of the print head 7 via the ASIC 303.

A print buffer 306 temporarily stores print data converted into a format transferrable to the print head 7.

A mask buffer 307 temporarily stores a mask pattern applied when the print data is transferred to the print head 7. Note that a plurality of mask patterns used for multipath printing are stored in the ROM 304. One of the mask patterns used in actual printing is read from the ROM 304 and is stored in the mask buffer 307.

While the present exemplary embodiment has been described with reference to the image processing unit disposed in the image printing apparatus 1000, the image processing unit may be included in the host computer 301.

Figure 5:
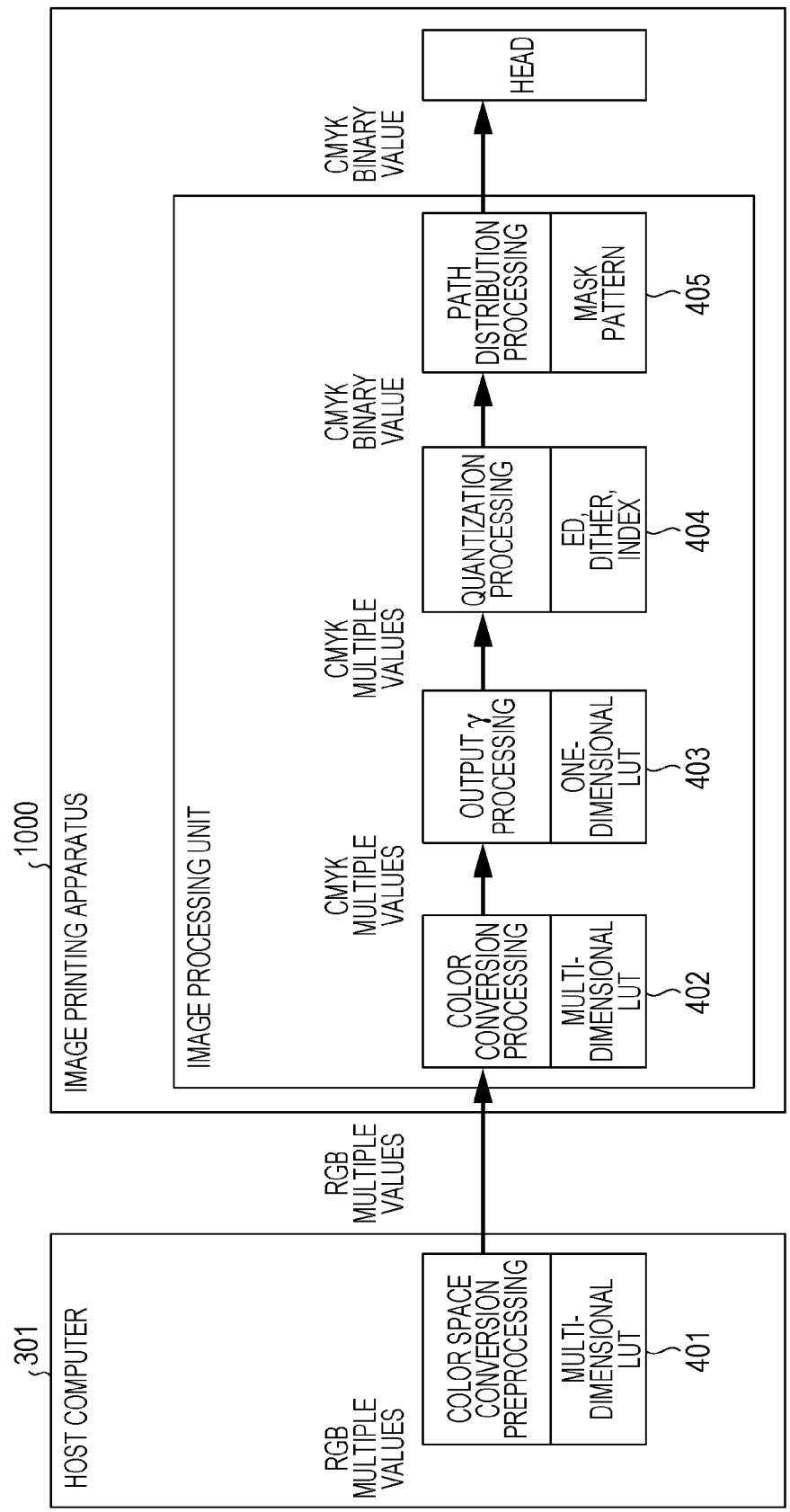
FIG. 5 is a block diagram illustrating the steps of data processing according to the exemplary embodiment.

FIG. 5 is a block diagram illustrating the steps of image processing according to the present exemplary embodiment.

In the image processing according to the present exemplary embodiment, multivalued image data (luminance data) with 8 bits of color depth for each of RGB colors (256 gray scales for each color) is obtained. Thereafter, processing is performed to output binary data (print data) with 1 bit for each of cyan ink, magenta ink, yellow ink, and black ink in each of scans. Note that the color types and the gray scales are not limited thereto.

The host computer 301 converts the image data expressed by a luminance signal having multiple values for R, G, and B into R-G-B multivalued data using a multi-dimensional LUT 401. Such color space conversion preprocessing (also referred to as "precedent color processing") is performed to correct a difference between a color space of an input image represented by the R, G, B image data and a color space reproducible by the image printing apparatus 1000. The data for each of R, G, and B colors subjected to the precedent color processing is transmitted to the image printing apparatus 1000.

The image printing apparatus 1000 converts each of the R, G, and B data subjected to the precedent color processing and received from the host computer 301 into C, M, Y, and K multivalued data using a multi-dimensional LUT 402 stored in the ROM. Such color conversion processing (also referred to as "subsequent color processing") is performed to convert input RGB image data expressed by a luminance signal or input CMYK data for colors of printer's ink into output CMYK image data expressed by a density signal.

Subsequently, the C-M-Y-K multivalued data subjected to the subsequent color processing is subjected to output γ correction using a one-dimensional LUT 403 for each color. In general, there is a non-linear relationship between the number of dots printed per unit area of the printing medium and a print characteristic, such as a reflected density, obtained by measuring the printed image. Accordingly, the output γ correction processing for correcting the input gray scale levels for C-M-Y-K multivalued data is performed so as to provide a linear relationship between, for example, the grayscale level of 10 bits for each of C, M, Y, and K and the density level of the image printed on the basis of the grayscale level.

Subsequently, binarization (quantization) processing 404 is performed. In the binarization processing, the 8-bit data for each of C, M, Y, and K colors obtained in the above-described manner is binarized into 1-bit data for each of C, M, Y, and K colors. According to the present exemplary embodiment, as a quantizating method 404 to binarize the data, an error diffusion method is employed. Since a quantizing method 404 using the error diffusion method is widely used, description of the quantizing method is not repeated. Note that as a binarizing technique, a dither method may be used instead of the error diffusion method. Alternatively, index rendering using an index pattern may be used.

Subsequently, path distribution processing is performed using the mask pattern 405. The data for each of the ink colors is distributed to each of scans, and the print data used to eject ink of each color is generated for each of scans.

The multipass printing method according to the present exemplary embodiment is described in detail below.

Figure 6:
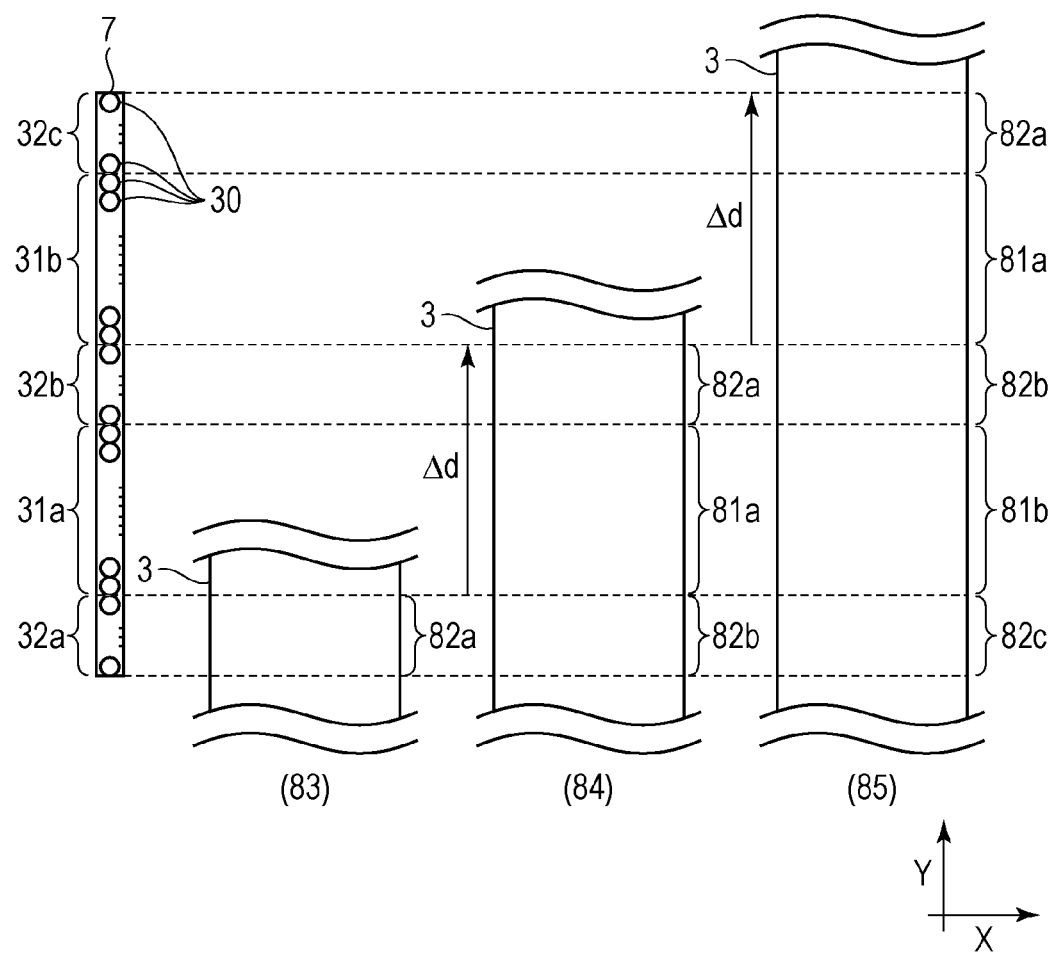
FIG. 6 illustrates a multipass printing method according to the exemplary embodiment.

FIG. 6 illustrates the multipass printing method according to the present exemplary embodiment. Note that for simplicity, the print head 7 has only one ejection port array disposed therein in FIG. 6.

According to the present exemplary embodiment, the print head 7 is scanned over a first area of the printing medium twice (or K times) and is scanned over a second area of the printing medium three times (or K+1 times) to print an image.

As illustrated in FIG. 6, 1440 ejection ports arranged in an ejection port array 22 are classified into five ejection port groups, that is, two (K) first ejection port groups 31a and 31b each formed from 693 ejection ports 30 and three (K+1) second ejection port groups 32a, 32b, and 32c each formed from 18 ejection ports 30 other than those of the first ejection port group. The second ejection port group 32a formed from a plurality of first ejection ports is located at an upstream end of the ejection port array 22 in the Y direction. In addition, the second ejection port group 32c formed from a plurality of second ejection ports is located at a downstream end of the ejection port array 22 in the Y direction. Furthermore, the second ejection port group 32b is located in the middle of the ejection port array 22 in the Y direction.

For a first scan over the printing medium 3, the printing medium 3 is conveyed so as to maintain a positional relationship (83) between the printing medium 3 and the print head 7. While maintaining such a positional relationship, the print head 7 is scanned in the X direction. Ink is ejected from the second ejection port group 32a onto a second area 82a of the printing medium as a first ink ejection.

Subsequently, the printing medium 3 is conveyed by a distance Δd in the Y direction so as to maintain a positional relationship (84) in which the second area 82a corresponding to the second ejection port group 32a in the previous scan corresponds to the second ejection port group 32b. Note that since the printing medium 3 is conveyed by a distance corresponding to the number of the ejection ports which is the sum of the numbers of ejection ports of the first ejection port group 31a and the second ejection port group 32b, Δd is a value corresponding to 711 (=18+693) ejection ports. That is, let M be the number of the ejection ports that form the first ejection port group 31a. Then, Δd is a value corresponding to (N−M)/K ejection ports. After the printing medium 3 is conveyed, the print head 7 is scanned in the X direction, and ink is ejected from the first ejection port group 31a and the second ejection port groups 32a and 32b. At that time, ink is ejected from the first ejection port group 31a and the second ejection port group 32a into the first area 81a and a second area 82b, respectively, as first ejection. In addition, ink is ejected from the second ejection port group 32b into the second area 82a as second ejection.

Subsequently, the printing medium 3 is conveyed by a distance Δd in the Y direction in the same manner as in the previous conveyance so as to maintain a positional relationship (85) between the printing medium 3 and the print head 7. While maintaining the positional relationship (85), the print head 7 is scanned in the in X direction, and ink is ejected from all the ejection ports 30 arranged in the ejection port array 22. At that time, ink is ejected from the first ejection port group 31a and the second ejection port group 32a onto a first area 81b and a second area 82c of the printing medium 3, respectively, as first ejection. In addition, ink is ejected from the first ejection port group 31b and the second ejection port group 32b onto the first area 81a and the second area 82b, respectively, as second ejection. Furthermore, ink is ejected from the second ejection port group 32c onto the second area 82a as third ejection.

Note that after the print head 7 is scanned while in the positional relationship (85), printing of an image in the first area 81a and the second area 82a of the printing medium 3 has been completed. Accordingly, in the subsequent printing, an image is printed in the entire area of the printing medium by alternately repeating scanning of the print head in the X direction and conveyance of the printing medium in the Y direction by the distance Δd. By printing an image using such a multipass printing method, an image including a sub-image printed in a first area 81 of the printing medium 3 in two scans and a sub-image printed in a second area 82 of the printing medium 3 in three scans can be obtained.

According to the present exemplary embodiment, for each of the above-described scan over the first area made twice and scan over the second area made three times, a mask pattern is applied to each of the first and second ejection port groups. Each of the mask patterns includes a print permitting pixel group formed from a set of print permitting pixels arranged so as to be adjacent to each other in the X direction and Y direction and a pixel that is not adjacent to another pixel. Each of the print permitting pixel group and the pixel is called a "unit of print permitting pixel" (hereinafter also simply referred to as a "unit"). The number of print permitting pixels in each of the two types of units is determined in an appropriate manner, and printing is performed.

The unit of print permitting pixel is described in detail below.

FIGS. 7A to 7D illustrate the definition of the unit of print permitting pixel and the average of the number of print permitting pixels in the units of print permitting pixel according to the present exemplary embodiment.

Figure 7A:
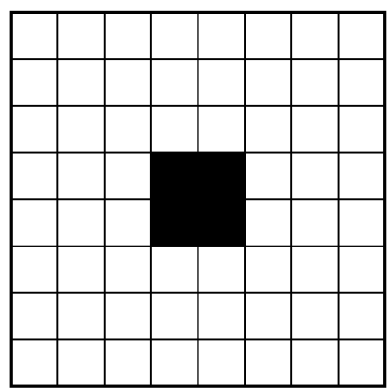
FIGS. 7A to 7D illustrate the definition of a unit of print permitting pixel according to the exemplary embodiment.

As described above, the print permitting pixel group is formed from a plurality of print permitting pixels arranged so as to be adjacent to each other in the X direction and the Y direction. For example, FIG. 7A illustrates a print permitting pixel group formed from four pixels that form a square having two pixels in each of the X and Y directions (a two-by-two square). In this case, the number of print permitting pixels in the unit is four.

Figure 7B:
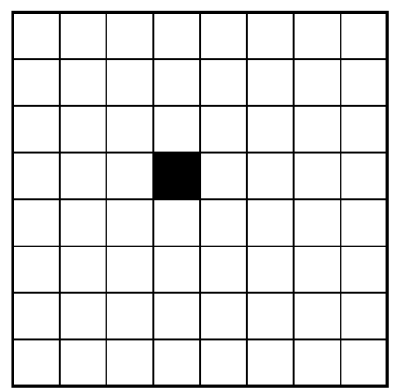

In addition, according to the present exemplary embodiment, even a print permitting pixel that is not adjacent to any one of the other print permitting pixels forms a unit of print permitting pixel. FIG. 7B illustrates a print permitting pixel having no print permitting pixel that is adjacent thereto. In this case, the number of print permitting pixels in the unit is one.

Figure 7C:
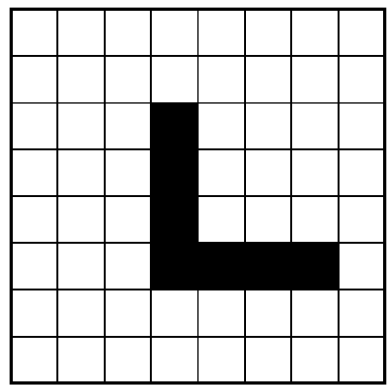

In addition, according to the present exemplary embodiment, a plurality of print permitting pixels that are adjacent to each other and that are arranged in a particular direction also form a print permitting pixel group. That is, the shape of the print permitting pixel group is not limited to an isotropic shape as illustrated in FIG. 7A. FIG. 7C illustrates a print permitting pixel group having an L shape in which pixels are arranged in only particular directions. In this case, the number of print permitting pixels in the unit is seven.

Figure 7D:
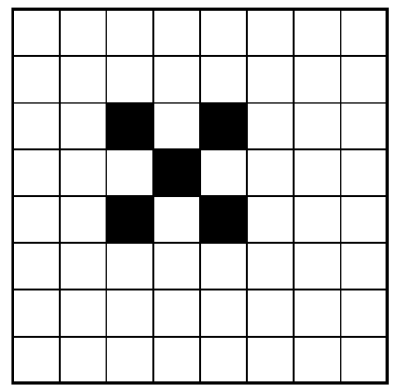

Note that according to the present exemplary embodiment, the print permitting pixels that are adjacent to each other refers to only a series of the print permitting pixels arranged in the X direction and the Y direction. Print permitting pixels that are adjacent to each other in a diagonal direction is not included in the print permitting pixels that are adjacent to each other. That is, according to the present exemplary embodiment, there is possibility that four print permitting pixels are arranged so as to be adjacent to each other such that two print permitting pixels arranged in the X direction are adjacent to one pixel and two print permitting pixels arranged in the Y direction are adjacent to the pixel. FIG. 7D illustrates five print permitting pixels that are adjacent to each other in diagonal directions. As described above, the print permitting pixels adjacent to each other in a diagonal direction do not form a unit. Accordingly, the five print permitting pixels form five different units. Consequently, the number of print permitting pixels in each of the five units of print permitting pixel illustrated in FIG. 7D is one.

Figure 8A:
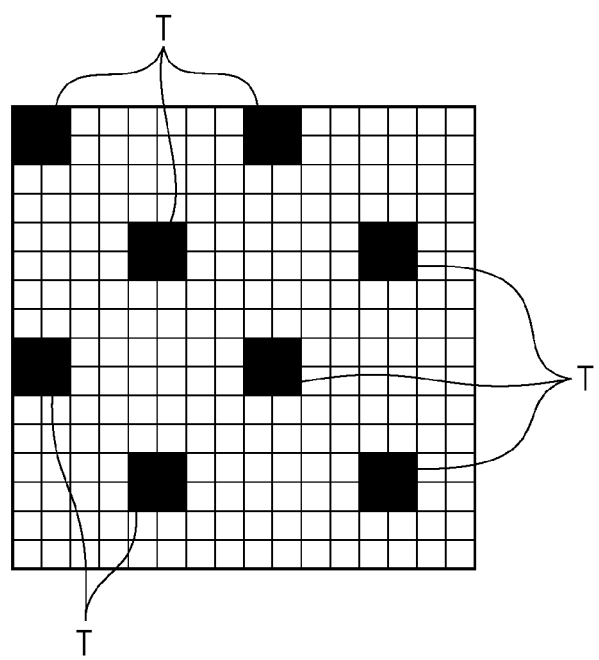
FIGS. 8A and 8B illustrate an evaluation area of a mask pattern according to the exemplary embodiment.
Figure 8B:
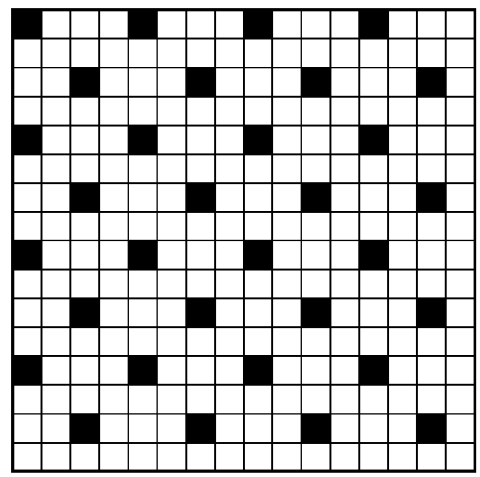

FIGS. 8A and 8B illustrate a method for calculating the average of the numbers of print permitting pixels in units of print permitting pixel according to the present exemplary embodiment.

According to the present exemplary embodiment, for simplicity, the average of the number of print permitting pixels in units of print permitting pixel in an evaluation area formed from a predetermined number of pixels is calculated, and the calculated value is used as the average of the number of print permitting pixels in the units of print permitting pixel in a unit area. Note that FIGS. 8A and 8B illustrate areas each formed from a 256-pixel square having 16 pixels in each of the X and Y directions as an area of a mask pattern corresponding to the evaluation area. According to the present exemplary embodiment, the average of the number of print permitting pixels in the units is obtained as follows. That is, the number of units included in an area of the mask pattern corresponding to the evaluation area is calculated. Thereafter, the number of print permitting pixels in each of the units in the area of the mask pattern corresponding to the evaluation area is calculated. In addition, the sum of the numbers of print permitting pixels in the units is calculated, and the sum is divided by the number of the units. The resultant value is used as the average of the number of print permitting pixels in the units of each of the mask patterns.

For example, in the area of the mask pattern corresponding to the evaluation area illustrated in FIG. 8A, 8 units T of print permitting pixel are formed. Each of the units T is formed from four print permitting pixels that are adjacent to each other. Accordingly, the average of the numbers of print permitting pixel in the units in the mask pattern illustrated in FIG. 8A is 4, which is obtained by dividing the sum of the numbers of print permitting pixel in the units (32 (=4×8)) by the number of units (8).

In contrast, print permitting pixels adjacent to each other do not exist in the area of the mask pattern corresponding to the evaluation area illustrated in FIG. 8B. That is, according to the above-described definition, 32 units each including only one print permitting pixel are disposed. Accordingly, the average of the number of print permitting pixels in the units in the mask pattern illustrated in FIG. 8B is 1, which is obtained by dividing the sum of the numbers of pixels in the units (32=(1×32)) by the number of units (32).

The mask patterns according to the present exemplary embodiment are described in detail below.

Figure 9A:
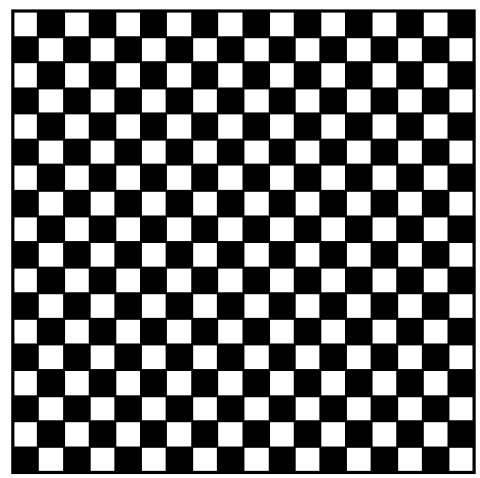
FIGS. 9A and 9B illustrate mask patterns each corresponding to a first area according to the exemplary embodiment.
Figure 9A:
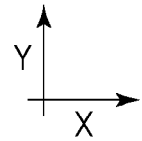
Figure 9B:
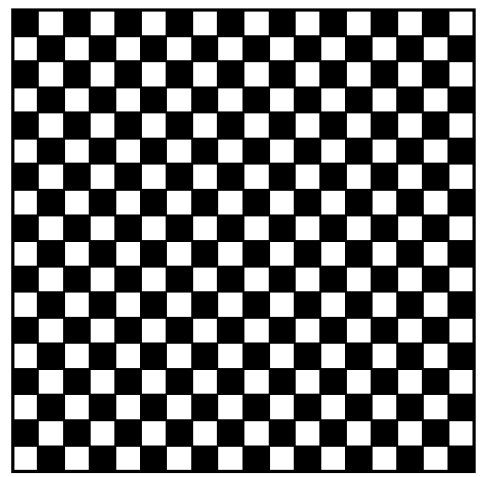
Figure 9B:
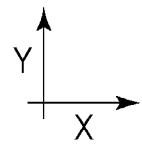
Figure 10A:
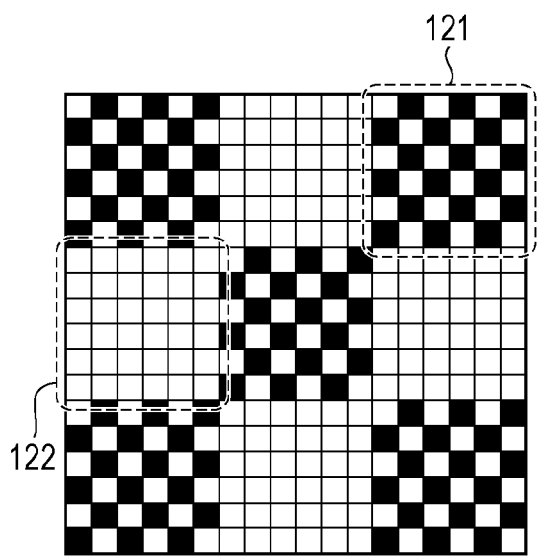
FIGS. 10A to 10C illustrate mask patterns each corresponding to a second area according to the exemplary embodiment.
Figure 10B:
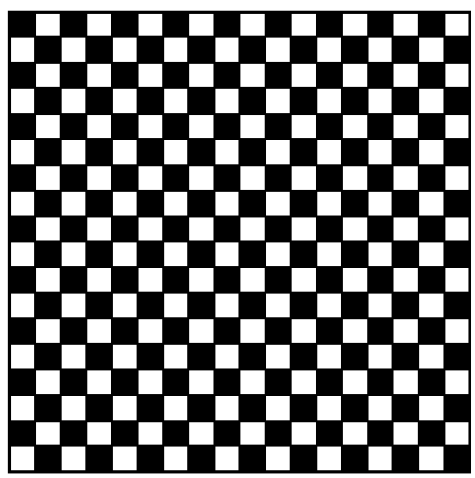
Figure 10C:
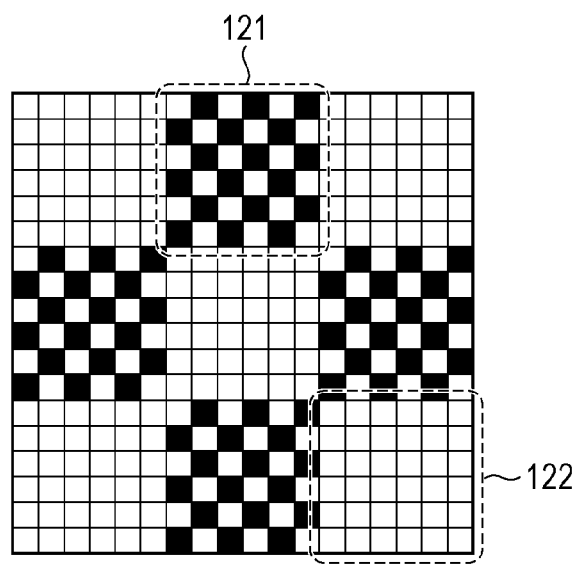

FIGS. 9A and 9B are schematic illustrations of two (K) mask patterns applied to two (K) first ejection port groups in the multipass printing method according to the present exemplary embodiment. In addition, FIGS. 10A to 10C are schematic illustrations of three (K+1) mask patterns applied to three (K+1) second ejection port groups in the multipass printing method according to the present exemplary embodiment.

Note that FIGS. 9A and 9B illustrate a mask pattern applied to the first ejection port group 31a corresponding to the first scan made over the first area and a mask pattern applied to the first ejection port group 31b corresponding to the second scan, respectively. In addition, FIGS. 10A, 10B and 100 illustrate mask patterns applied to the second ejection port group 32a corresponding to the first scan made over the second area, the second ejection port group 32b corresponding to the second scan, and the second ejection port group 32c corresponding to the third scan, respectively.

The mask patterns illustrated in FIGS. 9A and 9B are applied to the first ejection port group 31a corresponding to a first scan over the first area and the first ejection port group 31b corresponding to a second scan, respectively. Note that for simplicity, a mask pattern having 324 pixels (18 pixels in the X direction and 18 pixels in the Y direction) is illustrated in FIGS. 9A and 9B. This mask pattern indicates a repeating unit of the mask pattern. In reality, the mask patterns illustrated in FIGS. 9A and 9B are repeatedly used as the mask patterns change in the X direction and in the Y direction.

All the print permitting pixels of the mask pattern illustrated in FIG. 9A are disposed at different positions from the positions of all the print permitting pixels of the mask pattern illustrated in FIG. 9B so that the logical sum of the print permitting pixels of the mask patterns illustrated in FIGS. 9A and 9B represents all the pixels. Accordingly, by applying the mask patterns illustrated in FIGS. 9A and 9B, a droplet of ink can be applied to each of all the ejectable positions in the first area of the printing medium in the first and second scans over the first area.

In addition, in each of the mask patterns illustrated in FIGS. 9A and 9B, the print permitting pixels that are adjacent to each other in the X direction and in the Y direction are not present. That is, 32 units each having only one print permitting pixel therein are disposed. Accordingly, if the average of the numbers of print permitting pixels in the units of each of the mask patterns illustrated in FIGS. 9A and 9B is calculated using the above-described calculation method, the average of the number of print permitting pixels in the units is 1.

In contrast, the mask patterns illustrated in FIGS. 10A, 10B, and 10C are applied to the second ejection port group 32a corresponding to the first scan over the second area, the second ejection port group 32b corresponding to the second scan, and the second ejection port group 32c corresponding to the third scan, respectively. Note that like the mask patterns illustrated in FIGS. 9A and 9B, a mask pattern having 324 pixels (18 pixels in the X direction and 18 pixels in the Y direction) is illustrated in FIGS. 10A to 10C. This mask pattern indicates a repeating unit of the mask pattern. Accordingly, in reality, the mask patterns illustrated in FIGS. 10A, 10B, and 10C are repeatedly used as the mask patterns change in the X direction.

The print permitting pixels of the mask patterns illustrated in FIGS. 10A, 10B, and 10C are disposed at different positions from one another so that the logical sum of the print permitting pixels of the mask patterns illustrated in FIGS. 10A, 10B, and 10C represents all the pixels. Accordingly, by applying the mask patterns illustrated in FIGS. 10A, 10B, and 10C, a droplet of ink can be applied to each of all the ejectable positions in the second area of the printing medium through the first scan, second scan, and the third scan over the second area.

In addition, in each of the mask patterns illustrated in FIGS. 10A, 10B, and 10C, the print permitting pixels that are adjacent to each other in the X direction and in the Y direction are not present. Thus, according to the above-described calculation method, the average of the numbers of print permitting pixels in the units of each of the mask patterns illustrated in FIGS. 10A, 10B, and 10C is 1.

At that time, for the mask patterns illustrated in FIGS. 10A and 10C, the ratio of the number of print permitting pixels to the sum of the number of print permitting pixels and the number of non-print permitting pixels is set so as to be lower than the print permission ratio for the mask pattern illustrated in FIG. 10B and the mask pattern illustrated in each of FIGS. 9A and 9B. That is, the ejection volume of the second ejection port group 32a formed from the plurality of first ejection ports disposed at one end of the print head 7 to which the mask patterns illustrated in FIGS. 10A and 10C are applied and the ejection volume of the second ejection port group 32c formed from the second ejection ports disposed at the other end can be relatively decreased. In this manner, even when misalignment of conveyance of the printing medium or deviation of the ink ejecting direction caused by an air flow occurs, an image can be printed without the occurrence of bond stripes.

In addition, the mask patterns illustrated in FIGS. 10A and 10C are designed such that it has a first pixel group area including 18 print permitting pixels and 18 non-print permitting pixels and a second pixel group area including 36 non-print permitting pixels. The first and second pixel group areas are described in detail below.

As used herein, the term "first pixel group area" refers to an area that is located in a region of the mask pattern having the print permitting pixels therein and that is surrounded by the print permitting pixels or the non-print permitting pixels in the outermost region. In addition, the term "second pixel group area" refers to an area that is the same as the first pixel group area in size and that is formed from only non-print permitting pixels.

The mask pattern of 18-by-18 pixels illustrated in FIG. 10A is formed from five first pixel group areas 121 and four second pixel group areas 122. Each of the first pixel group area and the second pixel group area has a size of 6-by-6 pixels. In contrast, the mask pattern of 18-by-18 pixels illustrated in FIG. 10C is formed from four first pixel group areas 121 and five second pixel group areas 122.

The first pixel group areas of the mask pattern illustrated in FIG. 10A and the first pixel group areas of mask pattern illustrated in FIG. 10C are disposed so as not to be at the same location. That is, the first pixel group areas of the mask pattern illustrated in FIG. 10A are disposed at a position corresponding to the second pixel group areas of the mask pattern illustrated in FIG. 10C, and the first pixel group areas of the mask pattern illustrated in FIG. 10C are disposed at a position corresponding to the second pixel group areas of the mask pattern illustrated in FIG. 10A.

By printing an image on the basis of the multipass printing method using the above-described mask patterns, gloss unevenness can be reduced. Such a mechanism is described in detail below.

Figure 11A:
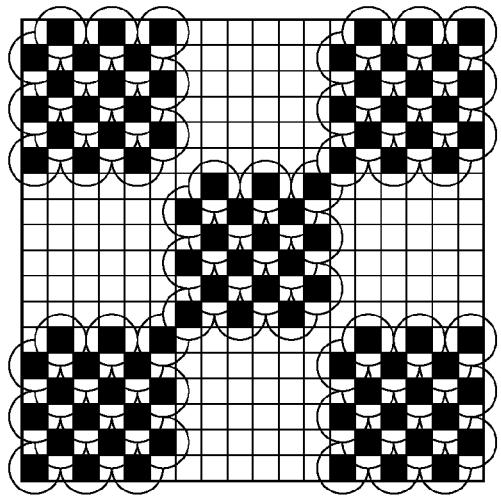
FIGS. 11A to 11C illustrate the steps of a printing process according to the exemplary embodiment.
Figure 11B:
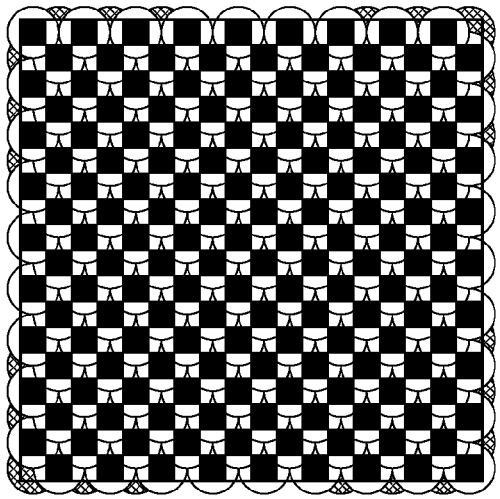
Figure 11C:
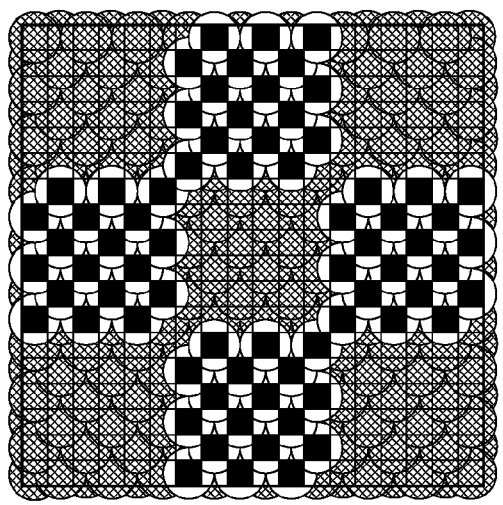

FIGS. 11A to 11C illustrate the steps of printing performed in the second area 82a of the printing medium 3 using the above-described mask patterns. Note that in the following description, for simplicity, an image having a duty of 100% (hereinafter also referred to as a "solid image") is formed on the printing medium. In addition, in FIGS. 11A to 11C, a black circle represents an ink droplet ejected in each of first to third scans, and a circle with hatchings represents an ink droplet ejected in a scan immediately previous to each of the first to third scans.

Figure 18:
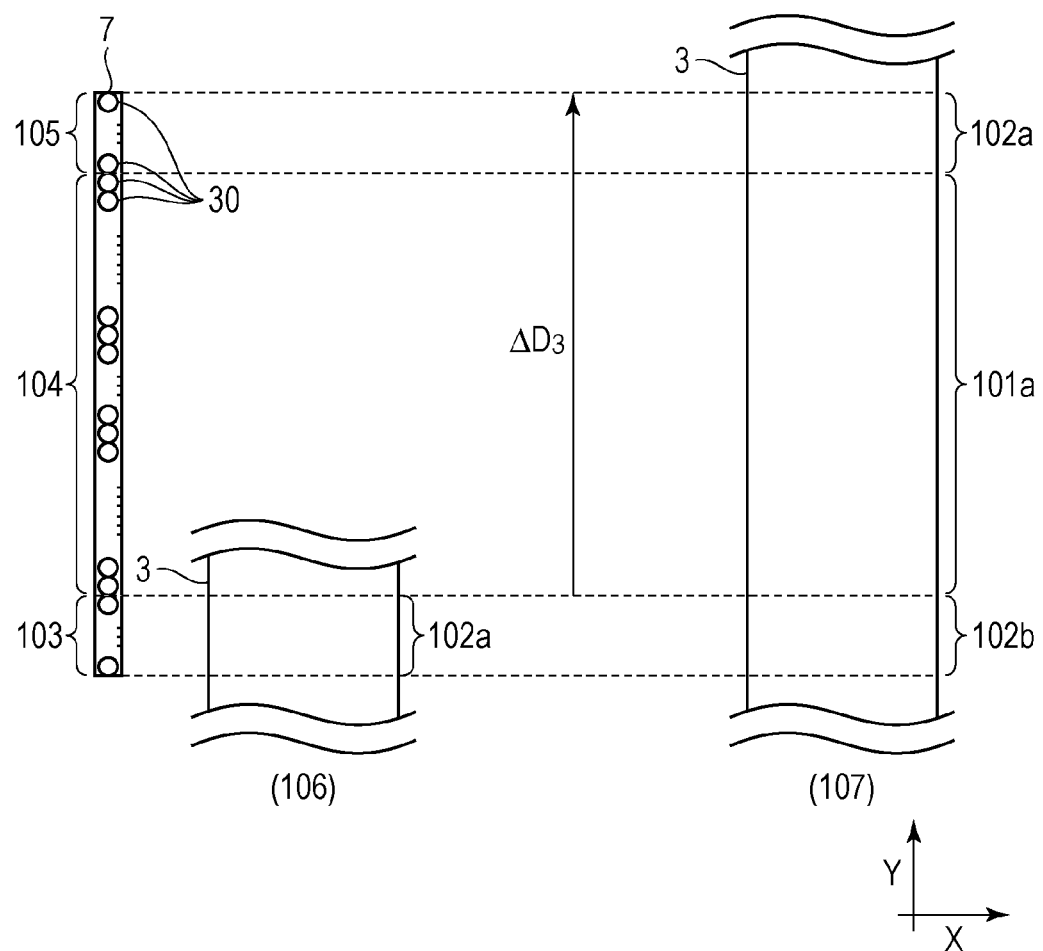
FIG. 18 illustrates a multipass printing method according to an exemplary embodiment.

In the first scan over the second area, ink is ejected from the second ejection port group 32a in accordance with the mask pattern illustrated in FIG. 10A. Accordingly, as illustrated in FIG. 11A, 18 ink droplets are formed at the positions corresponding to the first pixel group area in the second area illustrated in FIG. 10A so as to be in contact with one another. In contrast, ink droplets are not formed at the positions corresponding to the second pixel group area in the second area illustrated in FIG. 10B.

Subsequently, in a second scan over the second area, ink is ejected from the second ejection port group 32b in accordance with the mask pattern illustrated in FIG. 10B. Note that the print permitting pixels of the mask pattern illustrated in FIG. 10B are disposed so as to have an exclusive relationship with the print permitting pixels of the mask pattern illustrated in FIG. 10A and are uniformly dispersed in the entire area of the mask pattern. Accordingly, as illustrated in FIG. 11B, in a second scan, ink droplets are formed at the positions slightly different from those of the ink droplets formed in the first scan. In addition, ink droplets are formed over the entire second area. As a result, when the second scan is completed, printing of an image in an area for which the ink droplets are formed in the first scan has been completed.

In addition, in a third scan over the second area, ink is ejected from the second ejection port group 32c in accordance with the mask pattern illustrated in FIG. 10C. As illustrated in FIG. 11C, in the third scan, 18 ink droplets are formed at the positions corresponding to the first pixel group area in the second area illustrated in FIG. 10O so as to be in contact with each other. In the third scan, the ink droplets are formed at positions that differs from those of the ink droplets formed in the second scan and at which ink droplets are not formed in the first scan. As a result, when the third scan is completed, printing of an image in an area for which the ink droplets are not formed in the first scan has been completed. Thus, printing of the image in the entire second area is completed.

Figure 12:
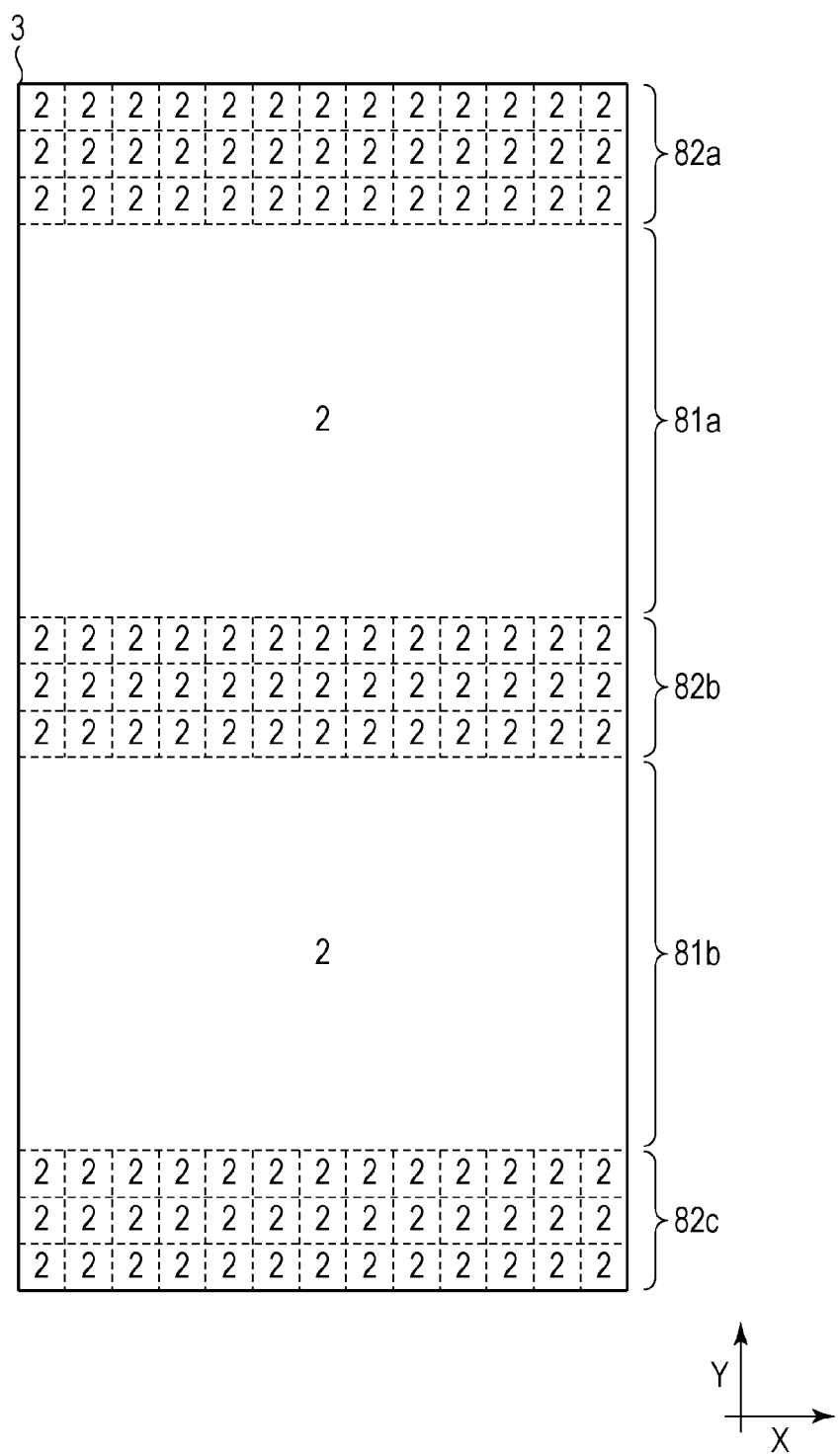
FIG. 12 illustrates the number of scans over each of the areas of a printed image according to the exemplary embodiment.

FIG. 12 illustrates the number of scans with ink ejection onto each of the areas when printing based on the above-described multipass printing method and the mask patterns is completed. Note that in FIG. 12, the number in a grid indicated by a dashed line in a printing medium indicates the number of scans with ink ejection performed for printing an image in the grid.

As described above, in the second area, printing of an image for an area corresponding to the first pixel group area of the mask pattern corresponding to the first scan is completed in the first and second scans. In addition, printing of an image for an area corresponding to the first pixel group area of the mask pattern corresponding to the third scan is completed in the second and third scans. That is, as illustrated in FIG. 12, when printing of the image on the printing medium is completed, an area having the image formed through the first and second scans and an area having the image formed through the second and third scans are present in the second areas 82a, 82b, and 82c.

In this manner, if each of the areas corresponding to the sizes of the pixel group areas is evaluated, an image can be printed in each of the second areas in two scans. That is, an image can be printed in all the first and second areas of the printing medium 3 in two scans. Accordingly, the irregularities of the image surface determined by the number of scans with ink ejection over each of the areas of the printing medium can be reduced and, thus, uniform glossiness can be obtained.

The case in which a mask pattern without the above-described first and second pixel group areas set therefor is applied to each of the scans over the second area to print an image is described next.

Figure 13A:
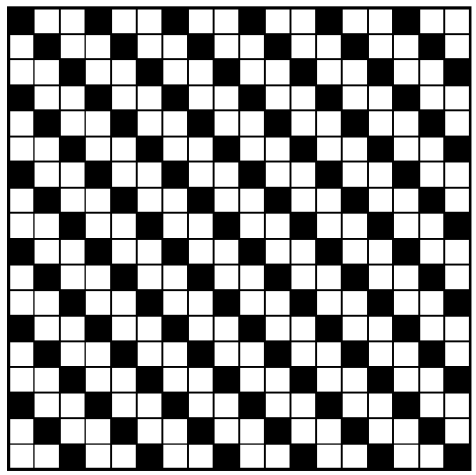
FIGS. 13A to 13C illustrate mask patterns according to a comparative example.
Figure 13A:
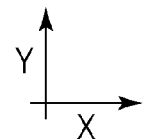
Figure 13B:
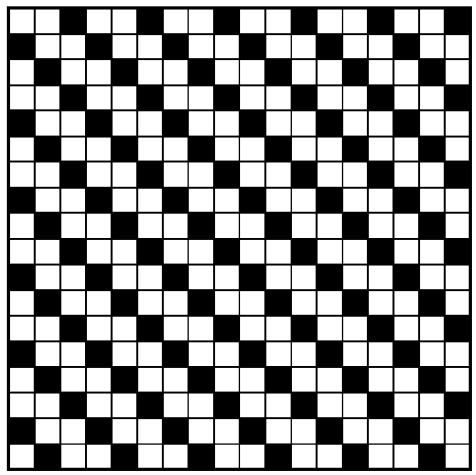
Figure 13B:
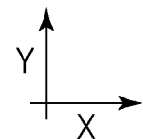
Figure 13C:
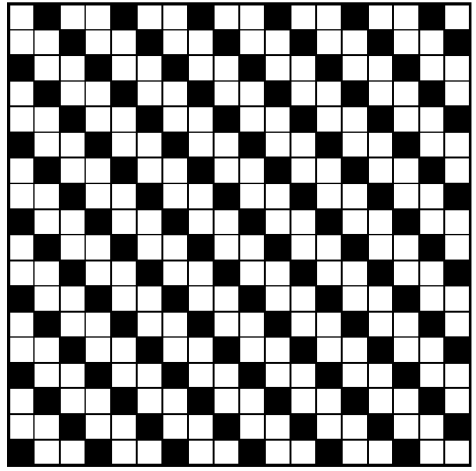
Figure 13C:
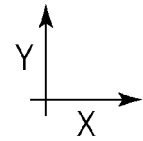

FIGS. 13A to 13C illustrate mask patterns applied to the scans over the second area as a comparative example. More specifically, FIGS. 13A to 13C illustrate mask patterns applied to the second ejection port group 32a, 32b, and 32c corresponding to the first, second, and third scans over the second area, respectively.

As illustrated in FIGS. 13A to 13C, according to the comparative example, the mask patterns used for printing an image in the second area do not have the above-described first and second pixel group areas set therefor, and the print permitting pixels are uniformly disposed in the entire area. Accordingly, in each of the scans over the second area, printing is performed in the entire second area.

Figure 14:
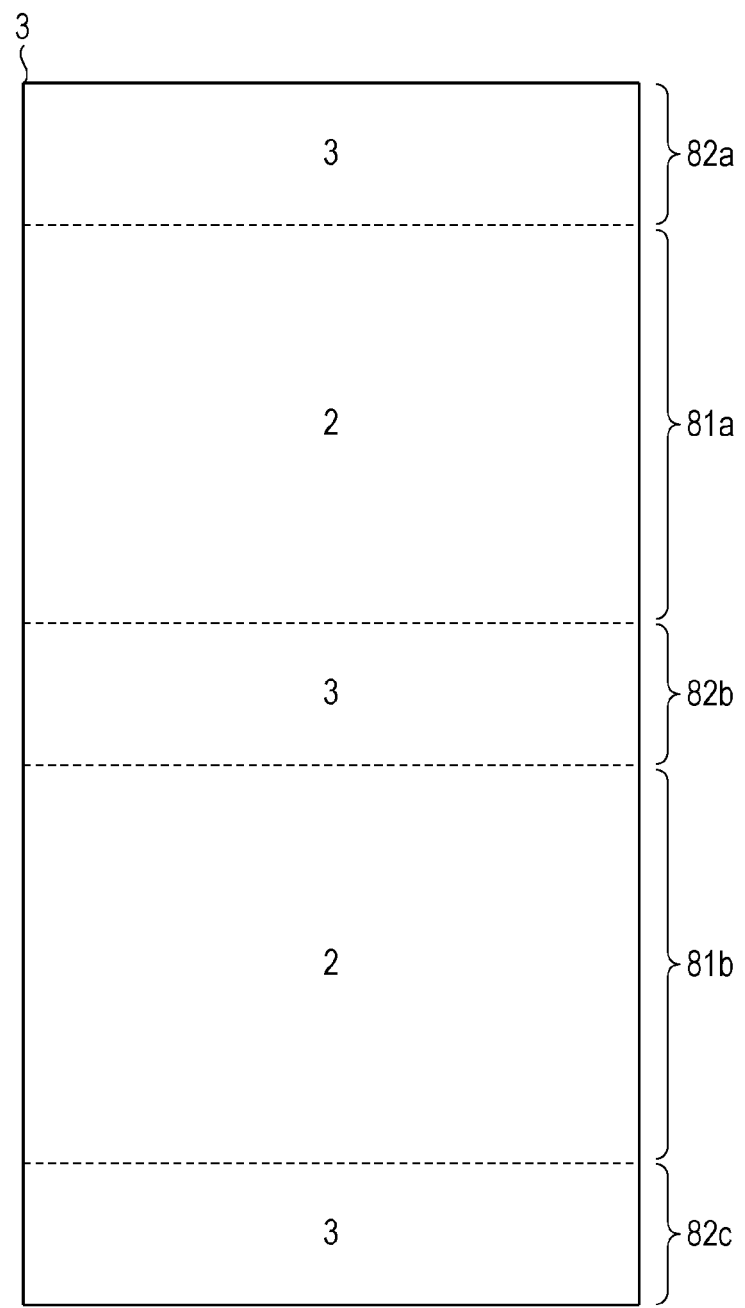
FIG. 14 illustrates the number of scans over each of the areas of a printed image according to an exemplary embodiment.
Figure 14:
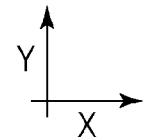

FIG. 14 illustrates the number of scans with ink ejection over each of the areas of the printing medium 3 when printing using the mask patterns illustrated in FIGS. 13A to 13C is completed.

As described above, according to the comparative example, ink is ejected into the entire second area in each of the three scans over the second area. Thus, when printing of an image on the printing medium is completed, two scans with ink ejection over the first area and three scans with ink ejection over the second area have been performed. Accordingly, the irregularities of the surface of the image printed in the second area is larger than that in the first area and, thus, the glossiness of the image in the second area is relatively decreased. Consequently, gloss unevenness may occur in the image printed on the printing medium.

As described above, by applying the multipass printing method and the mask patterns according to the present exemplary embodiment, the ejection volume from the ejection port group located at an end of the print head can be relatively decreased, and the number of scans with ink ejection over each of the areas of the printing medium can be made the same.

In this manner, according to the configuration of the present exemplary embodiment, the time required until completion of printing can be reduced. In addition, printing without the occurrence of bond stripes and the occurrence of gloss unevenness can be provided.

Second Exemplary Embodiment

In the first exemplary embodiment, the average of the numbers of print permitting pixels in the units in the mask patterns applied to each of the scans over the second area is reduced (to zero).

In contrast, according to the present exemplary embodiment, the average of the numbers of print permitting pixels in the units in the mask patterns corresponding to the second area is relatively high.

Note that descriptions of the configurations that are the same as in the first exemplary embodiment are not repeated.

Figure 15A:
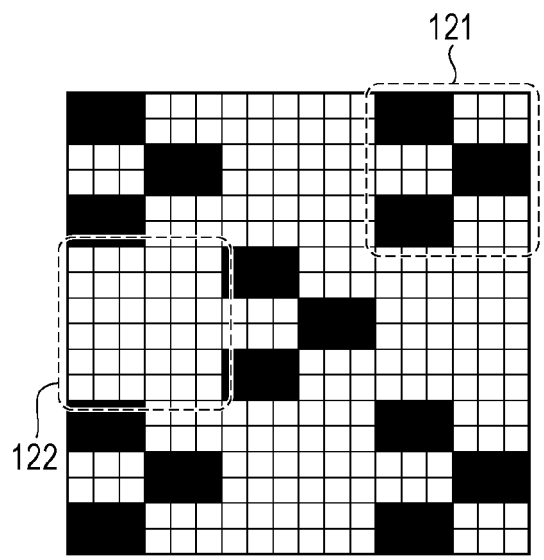
FIGS. 15A to 15C illustrate mask patterns each corresponding to a second area according to an exemplary embodiment.
Figure 15B:
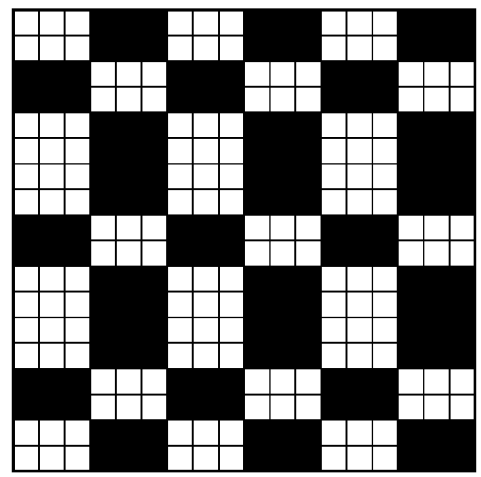
Figure 15C:
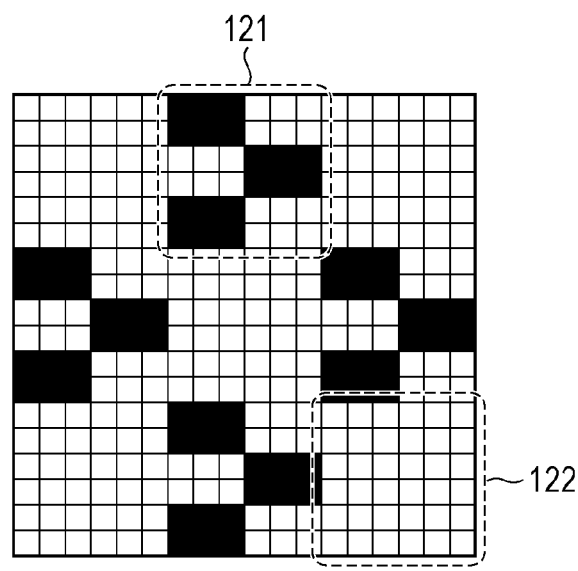

FIGS. 15A to 15C are schematic illustrations of mask patterns applied to the second ejection port group in the multipass printing method according to the present exemplary embodiment. More specifically, FIGS. 15A, 15B, and 15C illustrate the mask patterns applied to the second ejection port group 32a corresponding to a first scan over the second area, the second ejection port group 32b corresponding to a second scan over the second area, and the second ejection port group 32c corresponding to a third scan over the second area, respectively.

Like the mask patterns illustrated in FIGS. 10A, 10B, and 10C, the print permitting pixels in the mask patterns illustrated in FIGS. 15A, 15B, and 15C are disposed at different positions from one another so that the logical sum of the print permitting pixels represent all the pixels. In addition, like the mask patterns illustrated in FIGS. 10A, 10B, and 10C, each of the mask patterns illustrated in FIGS. 15A, 15B, and 15C is designed such that a first pixel group area including 18 print permitting pixels and 18 non-print permitting pixels and a second pixel group area including 36 non-print permitting pixels. Furthermore, the first pixel group areas are located in the mask patterns illustrated in FIGS. 15A, 15B, and 15C at different positions from one another.

In addition, for the mask patterns illustrated in FIGS. 15A and 15C, the print permission ratio is set so as to be lower than the print permission ratio for the mask pattern illustrated in FIG. 15B and the mask pattern illustrated in each of FIGS. 9A and 9B. Accordingly, since the ink ejection volume of the ejection port group disposed at an end of the print head can be relatively decreased, the occurrence of bond stripes can be prevented.

Furthermore, in the mask patterns illustrated in FIGS. 15A, 15B, and 15C, the print permitting pixels that are adjacent to each other in the X direction and in the Y direction are disposed. That is, the print permitting pixels are disposed so that the average of the numbers of print permitting pixels in the units is greater than the average of the numbers of the print permitting pixels in the units of the mask patterns illustrated in FIGS. 10A, 10B, and 100. This design is described below with reference to the mask pattern illustrated in FIG. 15A.

One of the first pixel group areas in the mask pattern illustrated in FIG. 15A includes three units each formed from six print permitting pixels. In addition, the number of units in the mask pattern is 15 (=3×5). Accordingly, the average of the numbers of print permitting pixels in the units is 6 (=6×15÷15), which is greater than the average of the numbers of print permitting pixels in the units in the mask pattern illustrated in FIG. 10A (i.e., 0).

If ink is ejected in accordance with the mask patterns illustrated in FIGS. 15A, 15B, and 15C, a plurality of ink droplets formed at positions corresponding to a plurality of print permitting pixels that form one unit in the printing medium are located so as to be adjacent to each other in the X direction and in the Y direction. Accordingly, a force applied to each of the ink droplets to get together increases. Thus, the plurality of ink droplets may turn into one large ink droplet. If such a large ink droplet is formed, a large dot formed by the big ink droplet in an image obtained when printing is completed may decrease the granular quality of the image.

However, as described above, the first pixel group areas in the mask patterns illustrated in FIGS. 15A and 15C are located at different positions. Accordingly, in the present exemplary embodiment, when printing of an image on the printing medium is completed, an area having a printed image formed in the first and second scans and an area having a printed image formed in the second and third scans are present in the second areas 82a, 82b, and 82c, as illustrated in FIG. 12. As a result, like the above-described exemplary embodiment, according to the present exemplary embodiment, by making the number of scans with ink ejection the same for each of the areas of the printing medium, the irregularities of the image surface can be decreased and, thus, an image having less gloss unevenness can be printed.

In this manner, according to the configuration of the present exemplary embodiment, the time required until completion of printing can be reduced. In addition, printing of an image without the occurrence of bond stripes and the occurrence of gloss unevenness can be provided.

Third Exemplary Embodiment

In the first and second exemplary embodiments, an image having the first area including a sub-image formed in 2 (K) scans and the second area including a sub-image formed in 3 (K+1) scans is printed.

In contrast, according to the present exemplary embodiment, an image having a third area having a sub-image formed in 4 (K+2) scans in addition to the first and second areas is printed.

A multipass printing method according to the present exemplary embodiment is described in detail below.

Figure 16:
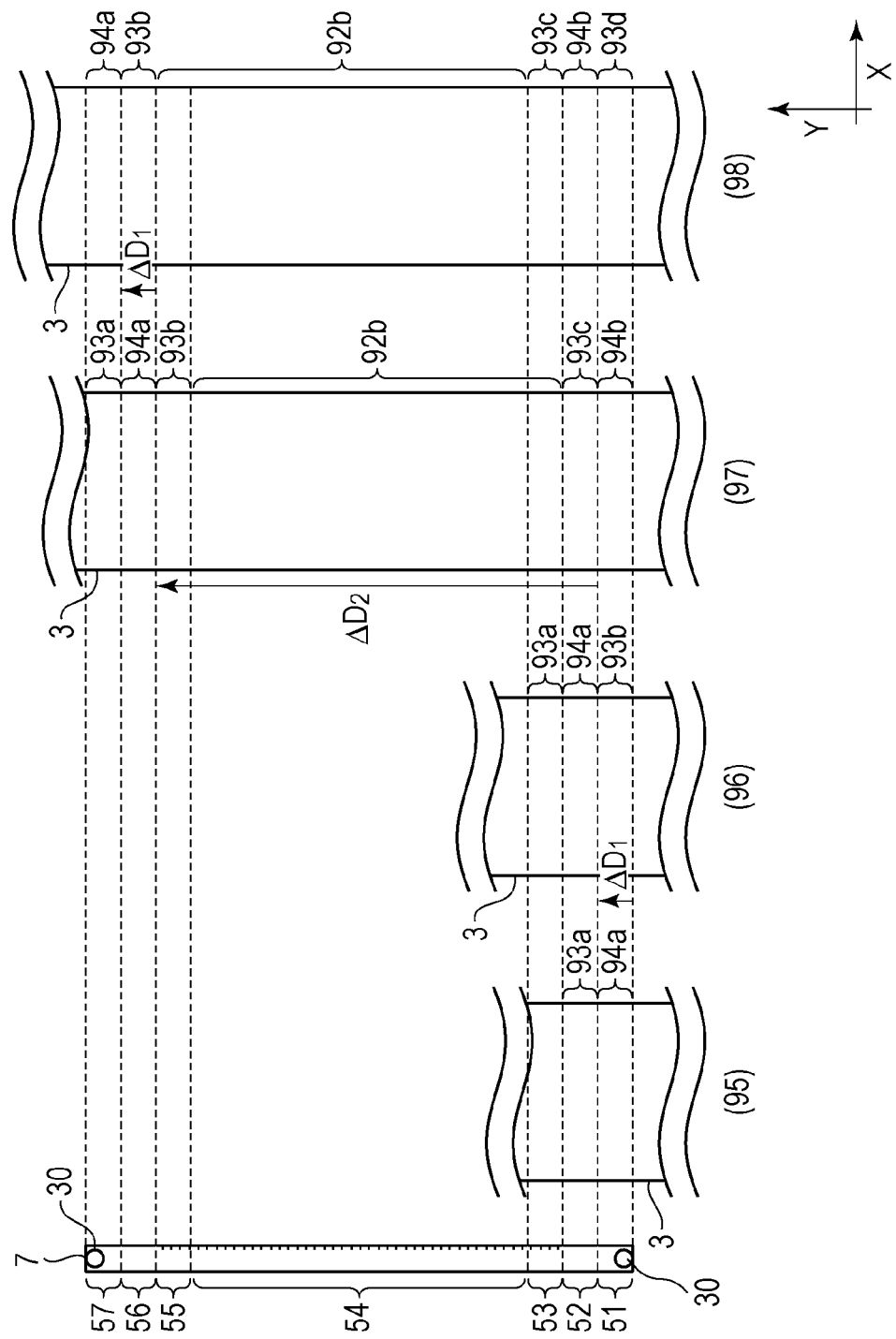
FIG. 16 illustrates a multipass printing method according to an exemplary embodiment.

FIG. 16 illustrates the multipass printing method according to the present exemplary embodiment. Note that for simplicity, a print head 7 in FIG. 16 has only one ejection port array 22 disposed therein.

According to the present exemplary embodiment, by scanning the first area of the printing medium twice, scanning the second area three times, and scanning the third area four times, an image is printed.

As illustrated in FIG. 16, 1440 ejection ports 30 of the ejection port array 22 are classified into seven ejection port groups, that is, one ejection port group 54 including 1332 ejection ports 30 and 6 ejection port groups 51, 52, 53, 55, 56, and 57 each including 18 ejection ports 30. Note that the ejection port groups 51, 52, 53, 54, 55, 56, and 57 are arranged in this order from the upstream side in the Y direction.

In a first scan over the printing medium 3, the printing medium 3 is conveyed so as to maintain a positional relationship (95) between the printing medium 3 and the print head 7 as illustrated FIG. 16. In the positional relationship, the print head 7 is scanned over the printing medium in the X direction, and ink is ejected from the ejection port group 52 into a second area 93a of the printing medium and is ejected from the ejection port group 51 into a third area 94a as a first scan.

Subsequently, the printing medium 3 is conveyed by a distance $\Delta D_1$ in the Y direction so that a positional relationship (96) illustrated in FIG. 16 is maintained. In the positional relationship, the third area 94a corresponding to the ejection port group 51 in the previous scan corresponds to the ejection port group 52. Note that the printing medium 3 is conveyed by only a distance that corresponds to the ejection ports arranged in the ejection port group 51. Accordingly, the distance $\Delta D_1$ is a value that corresponds to 18 ejection ports. After the printing medium 3 is conveyed, the print head 7 is scanned in the X direction, and ink is ejected from the ejection port groups 51, 52, and 53. During this scan, first ejection is performed into a second area 93b of the printing medium 3 by the ejection port group 51. In contrast, second ejection is performed into the second area 93a and the third area 94a of the printing medium 3 by the ejection port group 53 and the ejection port group 52, respectively.

Subsequently, the printing medium 3 is conveyed by a distance $\Delta D_2$ in the Y direction so that a positional relationship (97) between the printing medium 3 and the print head 7 is maintained, as illustrated in FIG. 16. Note that the printing medium 3 is conveyed by only a distance that corresponds to the number of ejection ports of three ejection port groups 52, 53, and 55 and one ejection port group 54. Accordingly, the distance $\Delta D_2$ is a value that corresponds to 1386 (=18×3+1332) ejection ports. In the positional relationship (97), the print head 7 is scanned over the printing medium 3 in the X direction, and ink is ejected from all the ejection ports 30 arranged in the ejection port array 22. In this scan, first ejection is performed into a first area 92a of the printing medium 3 by the ejection port group 53 and the ejection port group 54. Similarly, first ejection is performed into a second area 93c and a third area 94b of the printing medium 3 by the ejection port group 52 and the ejection port group 51, respectively. In addition, second ejection is performed into the second area 93b by the ejection port group 55. Furthermore, third ejection is performed into the second area 93a and the third area 94a by the ejection port group 57 and the ejection port group 56, respectively.

After the print head 7 is scanned in the positional relationship (97), printing of an image in the second area 93a of the printing medium is completed. That is, in the positional relationships (95), (96), and (97), the image is printed in the second area 93a in three scans with ink ejection from the ejection port groups 52, 53, and 57.

Subsequently, the printing medium 3 is conveyed by the distance $\Delta D_1$, which is the same distance employed in each of the first and second scans over the printing medium 3, in the Y direction so that a positional relationship (98) illustrated in FIG. 16 is maintained. In the positional relationship, the third area 94a corresponding to the ejection port group 56 in the previous scan corresponds to the ejection port group 57. After the printing medium 3 is conveyed, the print head 7 is scanned in the X direction, and ink is ejected from all the ejection ports 30 arranged in the ejection port array 22. During this scan, first ejection is performed into a second area 93d of the printing medium 3 by the ejection port group 51. In addition, second ejection is performed into the first area 92a by the ejection port group 54 and the ejection port group 55. Similarly, second ejection is performed into the second area 93c and the third area 94b by the ejection port group 53 and the ejection port group 52, respectively. Furthermore, third ejection is performed into the second area 93b by the ejection port group 56. Still furthermore, fourth ejection is performed into the third area 94a by the ejection port group 57.

After the print head 7 is scanned in the positional relationship (98), printing of images in the first area 92a, the second area 93b, and the third area 94a is completed. That is, the image is printed in the first area 92a in two scans with ink ejection from the ejection port group 53 and the ejection port group 54 and ink ejection from the ejection port group 54 and the ejection port group 55 in the positional relationships (97) and (98). The image is printed in the second area 93b in three scans with ink ejection from the ejection port groups 51, 55, and 56 in the positional relationships (96), (97) and (98), respectively. Furthermore, the image is printed in the third area through four scans with ink ejection from the ejection port groups 51, 52, 56, and 57 in the positional relationships (95), (96), (97), and (98), respectively.

After the print head 7 is scanned in the positional relationship (98), printing of images in only the second area 93c and 93d and the third area 94b of the printing medium 3 has not yet been completed. At that time, one scan with ink ejection has been performed over the second area 93d, and two scans with ink ejection has been performed over the second area 93c and the third area 94b. That is, at that time, the second areas 93c and 93d and the third area 94b correspond to the second areas 93a and 93b and the third area 94a after the print head 7 is scanned in the positional relationship (96). Accordingly, in the subsequent printing, the conveyance by the distance $\Delta D_2$ and the conveyance by the distance $\Delta D_1$ are alternately performed, and scan is sequentially performed in the positional relationships (97) and (98). Thus, the entire image is printed on the printing medium 3. By printing an image using such a multipass printing method, images can be printed in a first area 92 of the printing medium 3 in two scans, in a second area 93 in three scans, and in a third area in four scans.

Mask patterns applied in the present exemplary embodiment are described in detail below.

According to the present exemplary embodiment, when image are printed in the first area, the second area, and the third area, different mask patterns are applied.

When an image is printed in the first area, the mask patterns illustrated in FIGS. 9A and 9B are applied. More specifically, during a scan in the positional relationship (97) illustrated in FIG. 16, a mask pattern illustrated in FIG. 9A is applied to the ejection port group 53 and the ejection port group 54. In addition, during a scan in the positional relationship (98) illustrated in FIG. 16, a mask pattern illustrated in FIG. 9B is applied to the ejection port group 54 and the ejection port group 55. In this manner, an image is printed in the entire first area 92a in two scans with ink ejection.

When an image is printed in the second area, the above-described mask patterns illustrated in FIGS. 10A to 10O are applied. As an example, printing of an image in the second area 93b illustrated in FIG. 16 is described below. In the scan made in the positional relationship (96) of FIG. 16, the mask pattern illustrated in FIG. 10A is applied to the ejection port group 51. In addition, in the scan made in the positional relationship (97) of FIG. 16, the mask pattern illustrated in FIG. 10B is applied to the ejection port group 55. Furthermore, in the scan made in the positional relationship illustrated in the positional relationship (98) of FIG. 16, the mask pattern illustrated in FIG. 10C is applied to the ejection port group 56. In this manner, in the second area 93b, the area printed in two scans in the positional relationships (96) and (97) of FIG. 16 and the area printed in two scans in the positional relationships (97) and (98) of FIG. 16 can be arranged in the Y direction. Accordingly, when the second area 93b is divided into the sizes of the pixel group areas and is evaluated, an image can be printed in each of the areas in two scans with ink ejection.

FIGS. 17A to 17D are schematic illustrations of mask patterns applied when an image is printed in the third area using the multipass printing method according to the present exemplary embodiment.

Figure 17A:
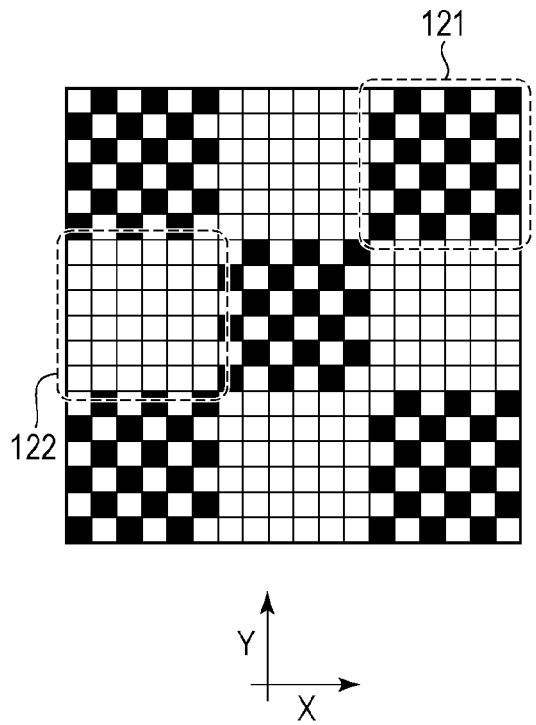
FIGS. 17A to 17D illustrate mask patterns corresponding to a third area according to an exemplary embodiment.
Figure 17B:
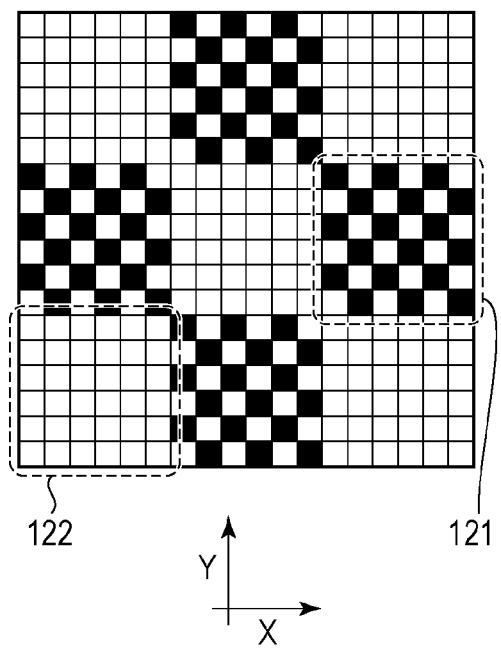
Figure 17C:
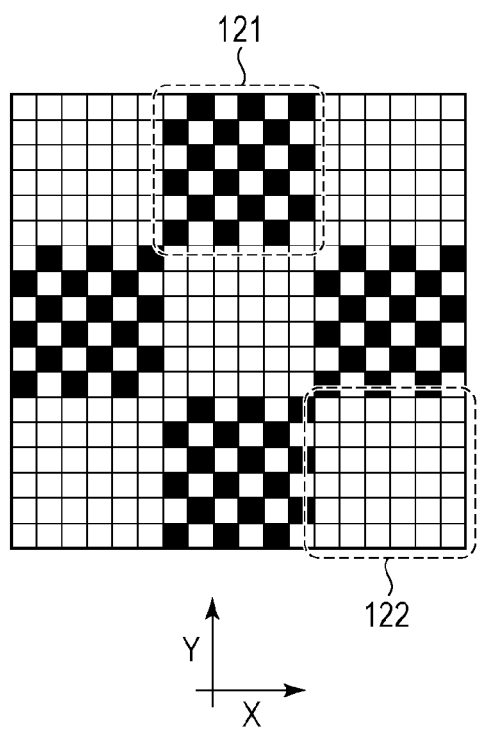

More specifically, FIG. 17A illustrates a mask pattern applied to the ejection port group 51 corresponding to a first scan over the third area 94a. FIG. 17B illustrates a mask pattern applied to the ejection port group 52 corresponding to a second scan over the third area 94a. FIG. 17C illustrates a mask pattern applied to the ejection port group 56 corresponding to a third scan over the third area 94a, and FIG. 17D illustrates a mask pattern applied to the ejection port group 57 corresponding to a fourth scan over the third area 94a.

The print permitting pixels of the mask patterns illustrated in FIGS. 17A, 17B, 17C, and 17D are located in different positions from one another so that the logical sum of the print permitting pixels of the mask patterns represents all the pixels. Accordingly, by applying the mask patterns illustrated in FIGS. 17A, 17B, 17C, and 17D, a droplet of ink can be applied to each of all the ejectable positions in the third area of the printing medium 3 in the first to fourth scans over the third area.

In addition, in each of the mask patterns illustrated in FIGS. 17A, 17B, 17C, and 17D, the print permitting pixels that are adjacent to each other in the X direction and in the Y direction are not present. Accordingly, if the average of the numbers of print permitting pixels in the units in each of the mask patterns illustrated in FIGS. 17A, 17B, 17C, and 17D is calculated using the above-described calculation method, the average of the number of print permitting pixels in the units is 1.

Figure 17D:
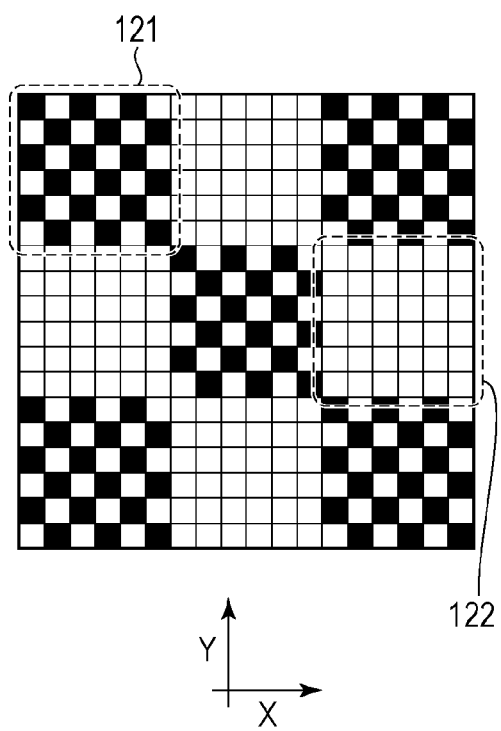

The number of print permitting pixels disposed in the mask pattern illustrated in each of FIGS. 17A, 17B, 17C, and 17D is set so as to be less than the number of print permitting pixels disposed in the mask pattern illustrated in each of FIGS. 9A and 9B. That is, the ejection volume of the ejection port groups 51 and 57 formed from the plurality of ejection ports disposed at an end of the print head 7 to which the mask patterns illustrated in FIGS. 17A and 17D are applied can be relatively decreased. Thus, an image can be printed without the occurrence of bond stripes.

In addition, each of the mask patterns illustrated in FIGS. 17A, 17B, 17C, and 17D is designed such that it has a first pixel group area including 18 print permitting pixels and 18 non-print permitting pixels and a second pixel group area including 36 non-print permitting pixels.

The mask patterns illustrated in FIGS. 17A and 17D are configured so as to have first pixel groups located at the same position. In addition, the mask patterns illustrated in FIGS. 17B and 17C are configured so as to have first pixel groups located at the same position. Accordingly, in the third area 94a, the area printed in two scans in the positional relationships (96) and (97) of FIG. 16 and the area printed in two scans in the positional relationships (95) and (98) of FIG. 16 can be arranged in the Y direction. In this manner, when the third area 94a is divided into the sizes of the pixel group areas and is evaluated, an image can be printed in each of the areas in two scans with ink ejection.

As described above, according to the above-described multipass printing method and the mask patterns, an image can be printed in each of the first, second, and third areas of the printing medium 3 in two scans. Accordingly, the irregularities of the image surface determined by the number of scans with ink ejection over each of the areas of the printing medium can be reduced and, thus, uniform glossiness can be obtained.

In this manner, according to the configuration of the present exemplary embodiment, even when the first, second, and third areas are arranged in the Y direction and an image is printed, printing of an image without the occurrence of bond stripes and the occurrence of gloss unevenness can be provided.

Fourth Exemplary Embodiment

In the description of the first and second exemplary embodiments, the first area in which printing is performed in two scans and the second area in which printing is performed in three scans are arranged in the Y direction, and an image is printed.

In contrast, according to the present exemplary embodiment, a first area in which printing is performed in one scan and the second area in which printing is performed in two scans are arranged in the Y direction, and an image is printed.

A multipass printing method according to the present exemplary embodiment is described in detail below.

FIG. 18 illustrates the multipass printing method according to the present exemplary embodiment. Note that for simplicity, a print head 7 in FIG. 18 has only one ejection port array disposed therein.

According to the present exemplary embodiment, by scanning the first area of the printing medium once and scanning the second area twice, an image is printed.

As illustrated in FIG. 18, 1440 ejection ports of an ejection port array 22 are classified into three ejection port groups, that is, one first ejection port group 104 including 1404 ejection ports 30 and two second ejection port groups 103 and 105 each including 18 ejection ports 30. Note that the second ejection port group 103, which is one of the two second ejection port groups, is located at the upstream end of the ejection port array 22 in the Y direction, and the second ejection port group 105, which is the other second ejection port group, is located at the downstream end of the ejection port array 22 in the Y direction.

In a first scan over the printing medium 3, the printing medium 3 is conveyed so as to maintain a positional relationship (106) between the printing medium 3 and the print head 7, as illustrated in FIG. 18. In the positional relationship, the print head 7 is scanned over the printing medium 3 in the X direction, and ink is ejected from the second ejection port group 103 to a second area 102a of the printing medium 3 as a first scan.

Subsequently, the printing medium 3 is conveyed by a distance $\Delta D_3$ in the Y direction so that a positional relationship (107) illustrated in FIG. 18 is maintained. In the positional relationship, the second area 102a corresponding to the second ejection port group 103 in the previous scan corresponds to the second ejection port group 105. Note that the printing medium 3 is conveyed by only a distance that corresponds to the sum of the number of the ejection ports arranged in the second ejection port group 103 and the first ejection port group 104. Accordingly, the distance $\Delta D_3$ is a value that corresponds to 1422 (=18+1404) ejection ports. After the printing medium 3 is conveyed, the print head 7 is scanned in the X direction, and ink is ejected from the first ejection port group 104 and the second ejection port groups 103 and 105. During this scan, first ejection is performed into a first area 101a and a second area 102b of the printing medium 3 by the first ejection port group 104 and the second ejection port group 103, respectively. In contrast, second ejection is performed into a second area 102a by the second ejection port group 105.

After the print head 7 is scanned in the positional relationship (107), printing of an image in the first area 101a and the second area 102a of the printing medium is completed. Accordingly, in the subsequent printing, by alternately repeating scan of the print head in the X direction and conveyance of the printing medium in the Y direction by the distance $\Delta D_3$, the entire image is printed on the printing medium. By printing an image using such a multipass printing method, an image having a sub-image formed in a first area 101 in one scan and a sub-image formed in a second area 102 in two scans arranged in the Y direction can be printed.

Mask patterns applied in the present exemplary embodiment are described in detail below.

Figure 19A:
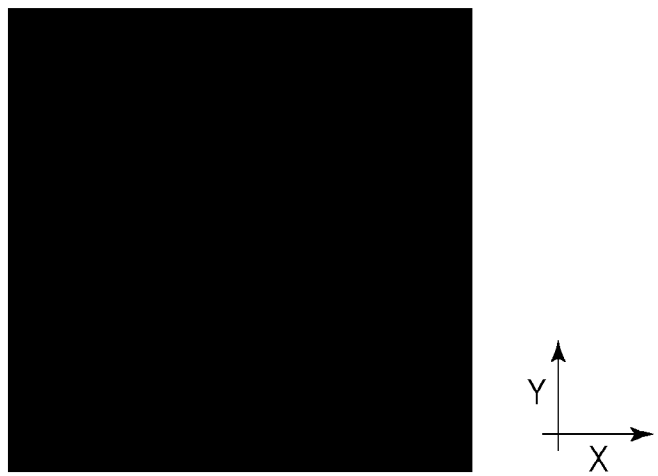
FIGS. 19A to 19C illustrate mask patterns each corresponding to a second area according to an exemplary embodiment.
Figure 19B:
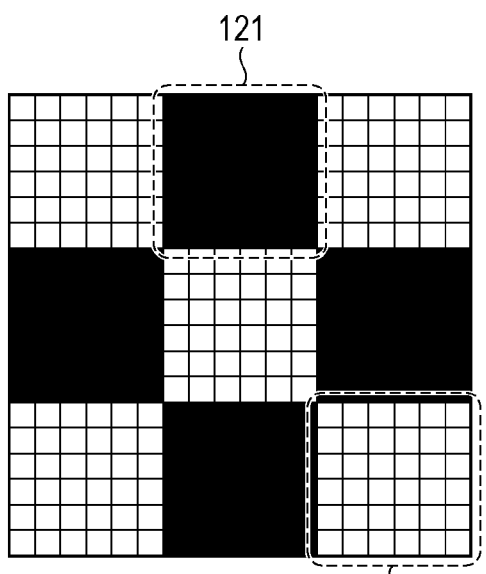
Figure 19C:
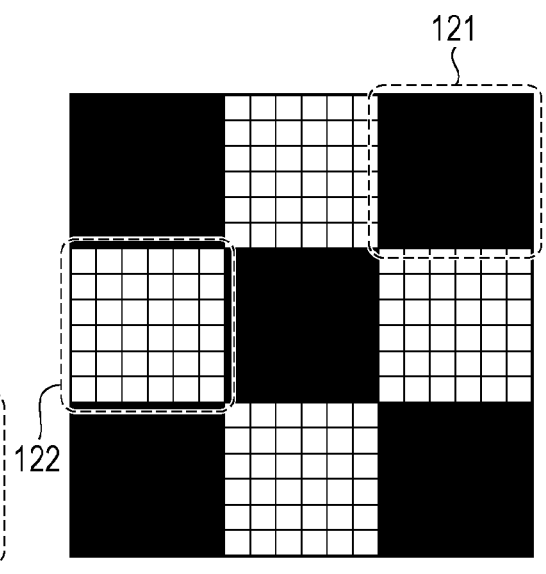

FIG. 19A is a schematic illustration of a mask pattern applied to the first ejection port group 104 in the multipass printing method according to the present exemplary embodiment. FIGS. 19B and 19C are schematic illustrations of mask patterns applied to the second ejection port groups 103 and 105 in the multipass printing method according to the present exemplary embodiment, respectively.

As illustrated in FIG. 19A, the mask pattern applied to the first ejection port group 104 has only print permitting pixels disposed therein. Accordingly, an image can be printed in the entire first area 101a to which ink is ejected from the first ejection port group 104 in one scan.

In contrast, the print permitting pixels of the mask patterns illustrated in FIGS. 19B and 19C are located in different positions from one another so that the logical sum of the print permitting pixels of the mask patterns represents all the pixels. Accordingly, by applying the mask patterns illustrated in FIGS. 19B and 19C, a droplet of ink can be applied to each of all the ejectable positions in the second area of the printing medium 3 in the first and second scans over the second area.

In addition, in each of the mask patterns illustrated in FIGS. 19B and 19C, a plurality of units of print permitting pixel each including 36 print permitting pixels that are adjacent to each other in the X direction and in the Y direction are formed. In this case, if the average of the numbers of print permitting pixels in the units of each of the mask patterns illustrated in FIGS. 19B and 19C is calculated using the above-described calculation method, the average of the number of print permitting pixels in the units is 6.

By printing an image using such mask patterns, when the first area 101a is divided into the sizes of the unit of print permitting pixel and is evaluated, an image can be printed in each of the areas through only one scan with ink ejection.

In this manner, according to the configuration of the present exemplary embodiment, even when an area having a sub-image printed in one scan and an area having a sub-image printed in two scans are arranged and the image is printed, printing of an image without the occurrence of bond stripes and the occurrence of gloss unevenness can be provided.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, according to the first to third exemplary embodiments described above, the sum of the number of print permitting pixels and the number of non-print permitting pixels in the first pixel group area of each of the mask patterns is at least 36, and the number of the non-print permitting pixels in the second pixel group area is at least 36. However, the other configuration can be employed. That is, any configuration in which each of the first and second pixel group areas is formed from a certain fairly large number of pixels can be employed. In addition, a configuration in which the first and second pixel group areas are formed from different numbers of pixels may be employed. Note that an appropriate threshold value of the number of pixels of the first and second pixel group area may vary in accordance with ink and a printing medium used. If, in particular, the threshold value is 20 or higher, the effect of the present invention can be provided. In addition, it is desirable that the number of pixels that form each of the first pixel group areas in a mask pattern be substantially the same as the number of pixels that form each of the second pixel group areas in the same mask pattern.

In the first exemplary embodiment, the first pixel group area of each of the mask patterns includes a certain fairly large number of print permitting pixels that are adjacent to each other in a diagonal direction that crosses the X direction and the Y direction. However, another configuration can be employed. That is, according to the present invention, any mask pattern having print permitting pixels dispersed in the first pixel group area may be employed. For example, print permitting pixels in the first pixel group area dispersed in a random mask pattern or in a blue mask pattern can provide the effect of the present invention. Note that it is desirable that the number of print permitting pixels adjacent to each other in the X direction or the Y direction in the first pixel group area be 6 or less.

While the first to third exemplary embodiments have been described with reference to the average of the numbers of print permitting pixels in the units in each of the mask patterns being zero, another configuration may be employed. That is, if a grainy texturing is not noticeable, the print permitting pixel may be disposed so as to be close to each other in the X direction and Y direction. Accordingly, any average of the numbers that is less than a predetermined threshold value can be employed. Note that the predetermined threshold value may vary in accordance with ink and a printing medium used. If, in particular, the predetermined threshold value is 10 or higher, the effect of the present invention can be provided.

While the exemplary embodiments have been described with reference to a thermal jet type inkjet recording apparatus that ejects ink by the energy of bubble generation as a result of heating and its printing method, the image printing apparatus is not limited to a thermal jet type inkjet recording apparatus. For example, the present invention can be effectively applied to a variety of print control apparatuses, such as a piezoelectric inkjet printing apparatus that ejects ink using a piezoelectric transducer.

In addition, while the exemplary embodiments have been described with reference to an image printing method using the image printing apparatus, the present invention can be widely applied to configurations in which a data generation apparatus, a data generation method, or a program that generates data used for performing the image printing method described in each of the exemplary embodiments is provided separately from a printing apparatus.

According to the image printing apparatus and the image printing method of the exemplary embodiments of the present invention, the period of time until printing is completed can be reduced, and an image can be printed without the occurrence of bond stripes and the occurrence of uneven gloss.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272399 filed Dec. 27, 2013, which is hereby incorporated by reference herein in its entirety.

What is claimed is:

1. An image printing apparatus for printing an image comprising:

a print head including an ejection port array having a plurality of ink ejection ports arranged in an arranging direction to eject ink;

a scanning unit configured to relatively scan the print head over a printing medium with the print head in a scanning direction that crosses the arranging direction a plurality of times;

a conveying unit configured to relatively convey the printing medium in a conveyance direction that crosses the scanning direction between scans of the print head performed by the scanning unit, so that a first area in which an image is printed in K (K≥2) scans of the print head and a second area in which an image is printed in (K+1) scans of the print head are arranged in the printing medium in the arranging direction, a plurality of first ejection ports arranged at one end of the ejection port array in the arranging direction form an image in the second area in a first scan of the (K+1) scans, and a plurality of second ejection ports arranged in the other end of the ejection port array in the arranging direction form an image in the second area in a second scan that differs from the first scan of the (K+1) scans;

an acquiring unit configured to acquire first image data corresponding to the ejection ports other than the first ejection ports and the second ejection ports and second image data corresponding to at least the first ejection ports and the second ejection ports;

a generating unit configured to generate first print data used for printing an image in the K scans over the first area on the basis of the first image data and K first mask patterns each having print permitting pixels and non-print permitting pixels therein and corresponding to one of the K scans over the first area, and second print data used for printing an image in the (K+1) scans over the second area on the basis of the second image data and (K+1) second mask patterns each having print permitting pixels and non-print permitting pixels therein and corresponding to one of the (K+1) scans over the second area; and an ejection control unit configured to cause the print head to eject ink into the first area in accordance with the first print data generated by the generating unit in each of the K scans, and cause the print head to eject ink into the second area in accordance with the second print data generated by the generating unit in each of the (K+1) scans, wherein (i) among the (K+1) second mask patterns, each of the second mask patterns corresponding to the first ejection ports and the second mask patterns corresponding to the second ejection ports is formed from a plurality of first pixel group areas and a plurality of second pixel group areas, each of the first pixel group areas being formed by both of the print permitting pixels and the non-print permitting pixels disposed therein, and each of the second pixel group areas being formed by only plurality of the non-print permitting pixels disposed therein, wherein (ii) each of the first pixel group areas of the second mask pattern corresponding to the first ejection ports is disposed at a position corresponding to one of the second pixel group areas of the second mask pattern corresponding to the second ejection ports, and each of the first pixel group areas of the second mask pattern corresponding to the second ejection ports is disposed at a position corresponding to one of the second pixel group areas of the second mask pattern corresponding to the first ejection ports, and wherein (iii) each of a print permission ratio for the second mask pattern corresponding to the first ejection ports and a print permission ratio for the second mask pattern corresponding to the second ejection ports is lower than each of the print permission ratios for each of the K first mask patterns, the print permission ratio being a ratio of a number of print permitting pixels to a sum of the number of print permitting pixels and a number of non-print permitting pixels, and wherein (iv) each of the print permission ratio for the second mask pattern corresponding to the first ejection ports and the print permission ratio for the second mask pattern corresponding to the second ejection ports is lower than each of the print permission ratios for each of K−1 second mask pattern corresponding to a part of ejection ports other than the first ejection ports and the second ejection ports.

2. The image printing apparatus according to claim 1, wherein each of (i) an average adjacent number of the print permitting pixels for the second mask pattern corresponding to the first ejection ports and (ii) an average adjacent number of the print permitting pixels for the second mask pattern corresponding to the second ejection ports is less than or equal to 6, the average adjacent number of the print permitting pixels being an average number of the print permitting pixels that are disposed so as to be adjacent to each other in the arranging direction or the scanning direction.

3. The image printing apparatus according to claim 2, wherein each of the average adjacent number of the print permitting pixels for the second mask pattern corresponding to the first ejection ports and the average adjacent number of the print permitting pixels for the second mask pattern corresponding to the second ejection ports is 0.

4. The image printing apparatus according to claim 1, wherein
the sum of the number of the print permitting pixels and the number of the non-print permitting pixels in one of the first pixel group areas is at least 36, and
wherein the number of the non-print permitting pixels in one of the second pixel group areas is at least 36.

5. The image printing apparatus according to claim 1, wherein each of (i) an average diagonal adjacent number the print permitting pixels for the second mask pattern corresponding to the first ejection ports and (ii) an average diagonal adjacent number of the print permitting pixels for the second mask pattern corresponding to the second ejection ports is greater than a predetermined value, the average diagonal adjacent number of the print permitting pixels being an average number of the print permitting pixels that are adjacent to another one of the print permitting pixels in a diagonal direction that diagonally crosses each of the arranging direction and the scanning direction.

6. The image printing apparatus according to claim 1, wherein
the print permitting pixels in the K first mask patterns are located at exclusive positions.

7. The image printing apparatus according to claim 1, wherein
the print permission ratios of the K first mask patterns are substantially the same.

8. The image printing apparatus according to claim 1, wherein
the print permitting pixels in the (K+1) second mask patterns are located at exclusive positions.

9. The image printing apparatus according to claim 1, wherein
among the (K+1) second mask patterns, the print permission ratios of the (K−1) second mask patterns other than the second mask pattern corresponding to the first ejection ports and the second mask pattern corresponding to the second ejection ports are substantially the same.

10. The image printing apparatus according to claim 1, wherein each of a plurality of dividing areas formed by dividing the second area into areas of a predetermined size along the arranging direction and the scanning direction is printed in K scans of the print head thereover.

11. The image printing apparatus according to claim 1, wherein a width of the second area in the arranging direction is less than a width of the first area in the arranging direction.

12. The image printing apparatus according to claim 1, wherein when a number of the ejection ports arranged in the ejection port array is N and a number of the first ejection ports arranged in the ejection port array is M, the conveying unit conveys the printing medium in the conveyance direction by a distance corresponding to (N−M)/K ejection ports between the scans performed by the scanning unit.

13. The image printing apparatus according to claim 2, wherein each of the average adjacent number of the print permitting pixels for each of the K first mask patterns is less than or equal to 6.

14. The image printing apparatus according to claim 1, wherein
K=2.

15. The image printing apparatus according to claim 1, wherein
the sum of the number of the print permitting pixels and the number of the non-print permitting pixels in the first pixel group area is equal to the sum of the number of the non-print permitting pixels in the second pixel group area.

16. An image printing method for printing an image using a print head, the print head including an ejection port array having a plurality of ink ejection ports arranged in an arranging direction to eject ink, the method comprising:
relatively scanning a printing medium with the print head in a scanning direction that crosses the arranging direction a plurality of times;
relatively conveying the printing medium in a conveyance direction that crosses the scanning direction between scans of the print head performed in the scanning step, so that a first area in which an image is printed in K (K≥2) scans of the print head and a second area in which an image is printed in (K+1) scans of the print head are arranged in the printing medium in the arranging direction, a plurality of first ejection ports arranged at one end of the ejection port array in the arranging direction form an image in the second area in a first scan of the (K+1) scans, and a plurality of second ejection ports arranged in the other end of the ejection port array in the arranging direction form an image in the second area in a second scan that differs from the first scan of the (K+1) scans;
acquiring first image data corresponding to ejection ports other than the first ejection ports and the second ejection ports and second image data corresponding to at least the first ejection ports and the second ejection ports;
generating first print data used for printing an image in the K scans over the first area on the basis of the first image data and K first mask patterns each having print permitting pixels and non-print permitting pixels therein and corresponding to one of the K scans over the first area and second print data used for printing an image in the (K+1) scans over the second area on the basis of the second image data and (K+1) second mask patterns each having print permitting pixels and non-print permitting pixels therein and corresponding to one of the (K+1) scans over the second area; and performing ejection control to cause the print head to eject ink into the first area in accordance with the first print data generated in the generating step in each of the K scans and cause the print head to eject ink into the second area in accordance with the second print data generated in the generating step in each of the (K+1) scans, wherein (i) among the (K+1) second mask patterns, each of the second mask patterns corresponding to the first ejection ports and the second mask patterns corresponding to the second ejection ports is formed from a plurality of first pixel group areas and a plurality of second pixel group areas, each of the first pixel group areas being formed by both of the print permitting pixels and the non-print permitting pixels disposed therein, and each of the second pixel group areas being formed by only plurality of the non-print permitting pixels disposed therein, wherein (ii) each of the first pixel group areas of the second mask pattern corresponding to the first ejection ports is disposed at a position corresponding to one of the second pixel group areas of the second mask pattern corresponding to the second ejection ports, and each of the first pixel group areas of the second mask pattern corresponding to the second ejection ports is disposed at a position corresponding to one of the second pixel group areas of the second mask pattern corresponding to the first ejection ports, and wherein (iii) each of a print permission ratio for the second mask pattern corresponding to the first ejection ports and a print permission ratio for the second mask pattern corresponding to the second ejection ports-is lower than each of the print permission ratios for each of the K first mask patterns, the print permission ratio being a ratio of a number of print permitting pixels to a sum of the number of print permitting pixels and a number of non-print permitting pixels, and wherein (iv) each of the print permission ratio for the second mask pattern corresponding to the first ejection ports and the print permission ratio for the second mask pattern corresponding to the second ejection ports is lower than each of the print permission ratios for each of K−1 second mask pattern corresponding to a part of the ejection ports other than the first ejection ports and the second ejection ports.

17. An image printing apparatus for printing an image comprising:
a print head including an ejection port array having a plurality of ink ejection ports arranged in an arranging direction to eject ink;
a scanning unit configured to relatively scan a printing medium with the print head in a scanning direction that crosses the arranging direction a plurality of times;
a conveying unit configured to relatively convey the printing medium in a conveyance direction that crosses the scanning direction between scans of the print head performed by the scanning unit so that a first area in which an image is printed in K (K≥2) scans of the print head and a second area in which an image is printed in (K+1) scans of the print head are arranged in the printing medium in the arranging direction, a plurality of first ejection ports arranged at one end of the ejection port array in the arranging direction form an image in the second area in a first scan of the (K+1) scans, and a plurality of second ejection ports arranged in the other end of the ejection port array in the arranging direction form an image in the second area in a second scan that differs from the first scan of the (K+1) scans;

an acquiring unit configured to acquire first image data corresponding to the ejection ports other than the first ejection ports and the second ejection ports and second image data corresponding to at least the first ejection ports and the second ejection ports;

a generating unit configured to generate first print data used for printing an image in the K scans over the first area on the basis of the first image data and K first mask patterns each having print permitting pixels and non-print permitting pixels therein and corresponding to one of the K scans over the first area and second print data used for printing an image in the (K+1) scans over the second area on the basis of the second image data and (K+1) second mask patterns each having print permitting pixels and non-print permitting pixels therein and corresponding to one of the (K+1) scans over the second area; and an ejection control unit configured to cause the print head to eject ink into the first area in accordance with the first print data generated by the generating unit in each of the K scans and cause the print head to eject ink into the second area in accordance with the second print data generated by the generating unit in each of the (K+1) scans, wherein when a number of the ejection ports arranged in the ejection port array is N and a number of the first ejection ports arranged in the ejection port array is M, the conveying unit conveys the printing medium in the conveyance direction by a distance corresponding to (N−M)/K ejection ports between the scans performed by the scanning unit, wherein (i) among the (K+1) second mask patterns, each of the second mask patterns corresponding to the first ejection ports and the second mask patterns corresponding to the second ejection ports is formed from a plurality of first pixel group areas each having the print permitting pixels and the non-print permitting pixels disposed therein and a plurality of second pixel group areas each having only the non-print permitting pixels disposed therein, wherein (ii) each of the first pixel group areas of the second mask pattern corresponding to the first ejection ports is disposed at a position corresponding to one of the second pixel group areas of the second mask pattern corresponding to the second ejection ports, and each of the first pixel group areas of the second mask pattern corresponding to the second ejection ports is disposed at a position corresponding to one of the second pixel group areas of the second mask pattern corresponding to the first ejection ports, and wherein (iii) for each of the second mask pattern corresponding to the first ejection ports and the second mask pattern corresponding to the second ejection ports, a print permission ratio representing a ratio of the number of print permitting pixels to a sum of a number of print permitting pixels and a number of non-print permitting pixels is lower than a print permission ratio for each of the K first mask patterns.

18. The image printing apparatus according to claim 17, wherein a print permission ratio of each of the second mask pattern corresponding to the first ejection ports and the second mask pattern corresponding to the second ejection ports is lower than a print permission ratio of each of the (K−1) second mask patterns other than the second mask pattern corresponding to the first ejection ports and the second mask pattern corresponding to the second ejection ports among the (K+1) second mask patterns.

* * * * *